(12) United States Patent
Iriyama

(10) Patent No.: US 11,428,912 B2
(45) Date of Patent: Aug. 30, 2022

(54) ZOOM LENS AND IMAGE PICKUP APPARATUS

(71) Applicant: CANON KABUSHIKI KAISHA, Tokyo (JP)

(72) Inventor: Yutaka Iriyama, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 268 days.

(21) Appl. No.: 16/791,069

(22) Filed: Feb. 14, 2020

(65) Prior Publication Data

US 2020/0271909 A1 Aug. 27, 2020

(30) Foreign Application Priority Data

Feb. 22, 2019 (JP) .............................. JP2019-030906

(51) Int. Cl.
| | | |
|---|---|---|
| *G02B 15/14* | (2006.01) | |
| *G02B 15/167* | (2006.01) | |
| *G02B 13/18* | (2006.01) | |

(52) U.S. Cl.
CPC ..... *G02B 15/145125* (2019.08); *G02B 13/18* (2013.01); *G02B 15/167* (2013.01)

(58) Field of Classification Search
CPC ............ G02B 15/145125; G02B 13/18; G02B 15/167
See application file for complete search history.

(56) References Cited

U.S. PATENT DOCUMENTS

| | | | |
|---|---|---|---|
| 9,402,031 B2 | 7/2016 | Iriyama | |
| 9,648,244 B2 | 5/2017 | Iriyama | |
| 10,401,600 B2 | 9/2019 | Iriyama | |
| 2009/0128923 A1* | 5/2009 | Toyama | ............... G02B 15/173 359/683 |
| 2009/0135496 A1* | 5/2009 | Nagahara | ....... G02B 15/145125 359/682 |
| 2016/0124199 A1 | 5/2016 | Sanjo et al. | |

FOREIGN PATENT DOCUMENTS

| | | |
|---|---|---|
| JP | 2015004917 A | 1/2015 |
| JP | 2016173529 A | 9/2016 |

* cited by examiner

*Primary Examiner* — Jack Dinh
(74) *Attorney, Agent, or Firm* — Carter, DeLuca & Farrell LLP

(57) ABSTRACT

Provided is a zoom lens including, from object side: one/two first positive units including a lens unit arranged at closest to object side not movable for zooming ; one/two second negative units movable toward image side for zooming from wide end to telephoto end; one/two third units including a negative unit arranged closest to object side and movable along a locus convex toward object side for zooming; a fourth positive unit movable for zooming; and a fifth unit, and including an aperture stop in image side of the fourth unit. A distance between object side surface of the first unit and the aperture stop, a length of the first unit, and movement amounts of the second unit from wide end to telephoto end and of the fourth unit from wide end to an intermediate zoom state where the second and third units are closest to each other are set appropriately.

15 Claims, 11 Drawing Sheets

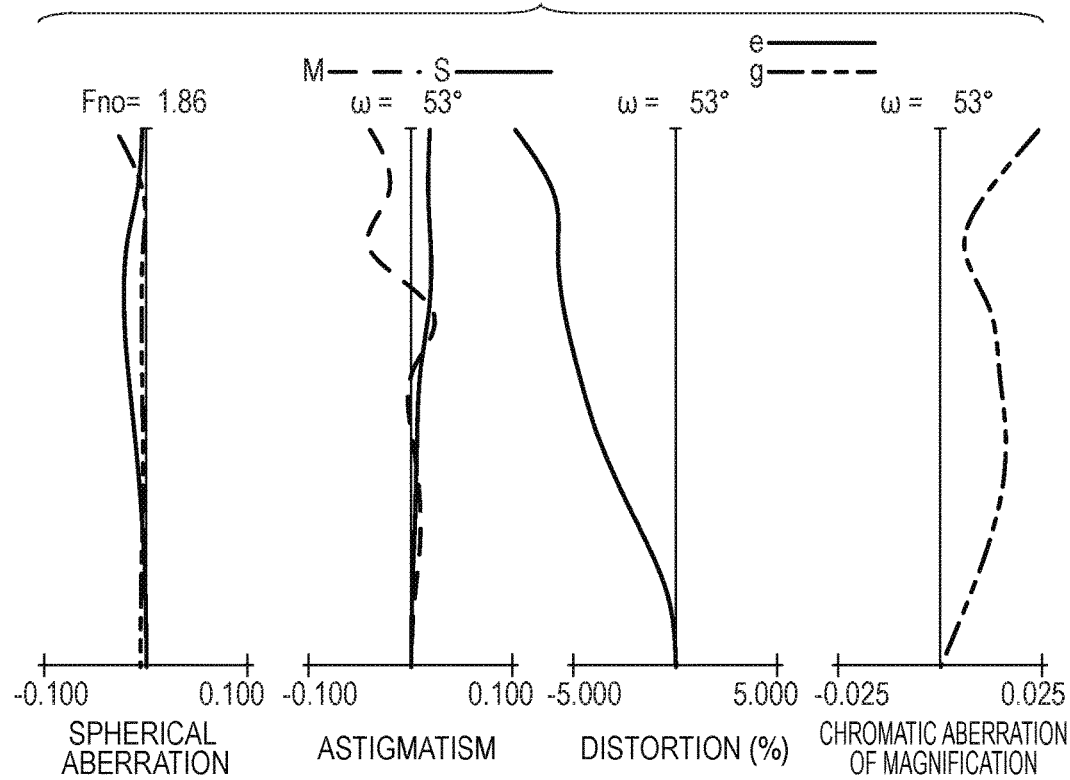
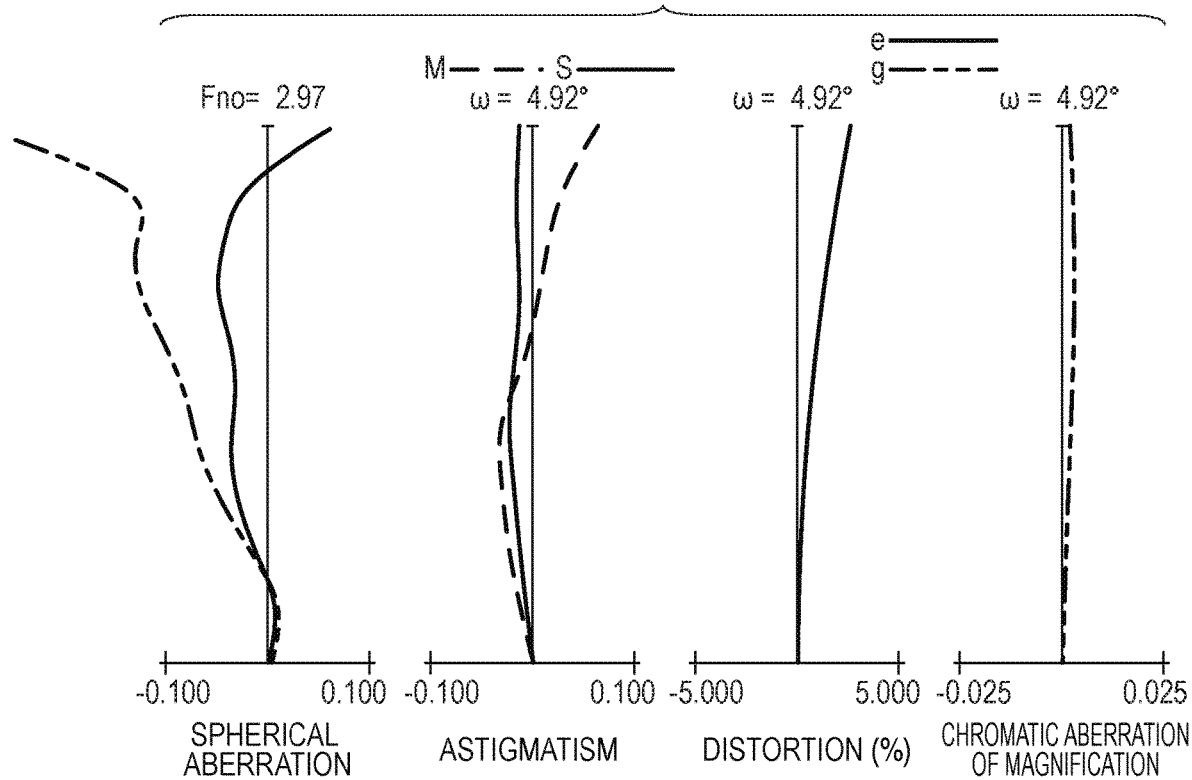

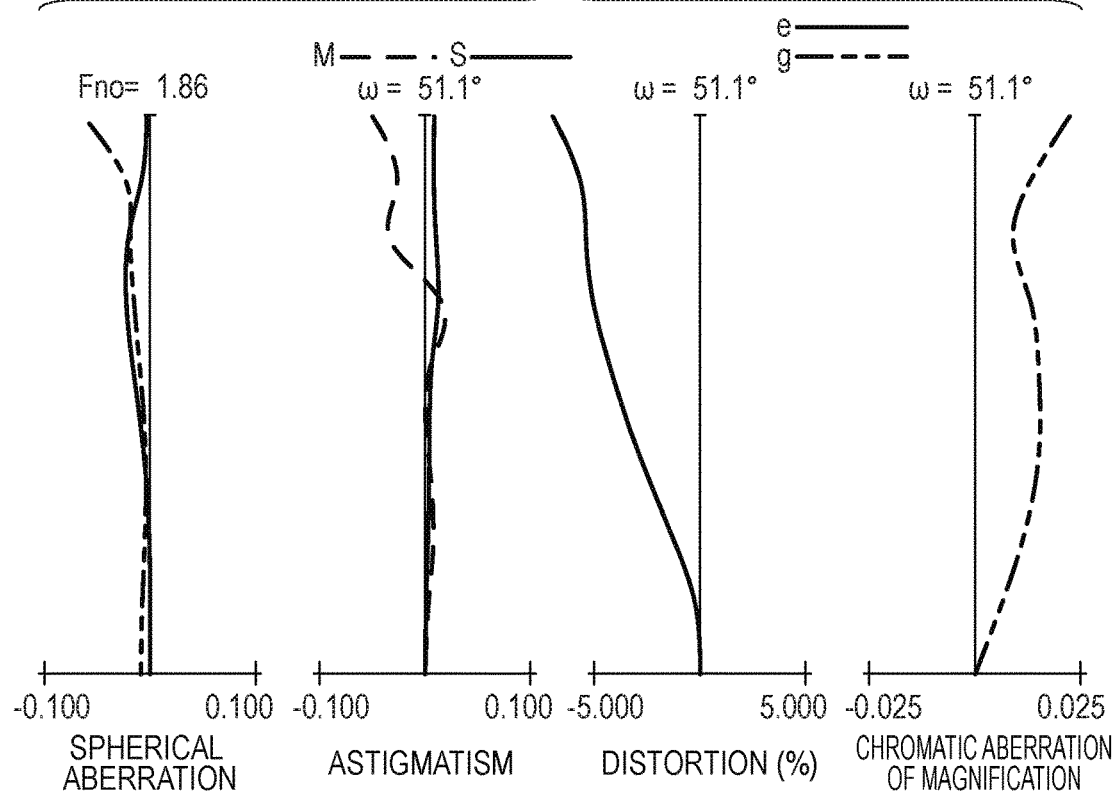
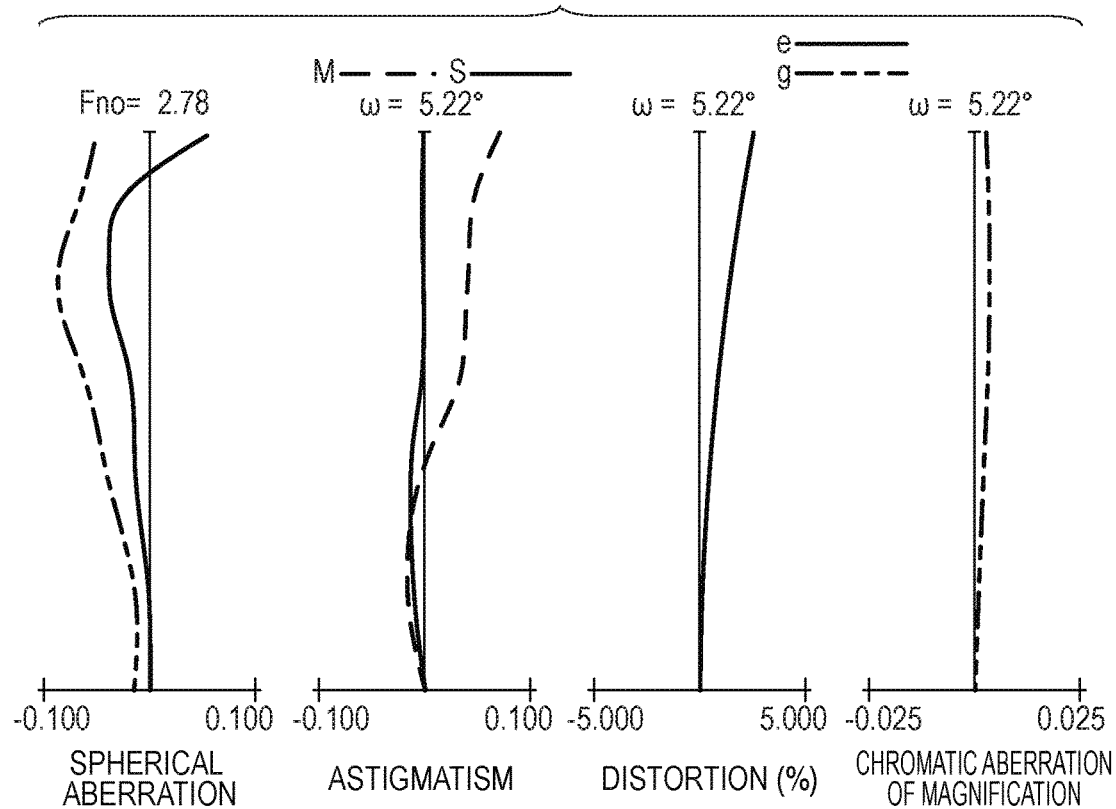

ZOOM LENS AND IMAGE PICKUP APPARATUS

BACKGROUND OF THE INVENTION

Field of the Invention

The present invention relates to a zoom lens and an image pickup apparatus.

Description of the Related Art

For example, in Japanese Patent Application Laid-Open No. 2015-004917, there is disclosed a zoom lens consisting of, in order from an object side to an image side, five lens units having positive, negative, negative, positive, and positive refractive powers, respectively, in which first and fifth lens units are configured not to move for zooming, second to fourth lens units are configured to move for zooming, and a movement locus of the third lens unit has a convex shape on the image side. In Japanese Patent Application Laid-Open No. 2016-173529, there is disclosed a zoom lens consisting of, in order from an object side to an image side, five lens units having positive, negative, negative, positive, and positive refractive powers, respectively, in which first and fifth lens units are configured not to move for zooming, and second to fourth lens units are configured to move for zooming.

However, the zoom lenses disclosed in Japanese Patent Application Laid-Open No. 2015-004917 and Japanese Patent Application Laid-Open No. 2016-173529 do not achieve optimal movement loci of movable lens units for zooming, and thus the size of the zoom lens, in particular, the size of the first lens unit, becomes larger. Further, in each of the zoom lenses, aberration variation due to zooming becomes larger.

SUMMARY OF THE INVENTION

An aspect of embodiments provides, for example, a zoom lens beneficial in small size and high optical performance thereof.

There is provided a zoom lens including in order from an object side to an image side: one or two first lens units having a positive refractive power, the one or two first lens units including a lens unit, the lens unit configured not to move for zooming and arranged closest to the object side; one or two second lens units having a negative refractive power and configured to move for zooming; one or two third lens units configured to move for zooming, the one or two third lens units including a lens unit, the lens unit having a negative refractive power and arranged closest to the object side; a fourth lens unit having a positive refractive power and configured to move for zooming; and a fifth lens unit configured not to move for zooming, in which an interval of each pair of adjacent lens units is changed for zooming, in which the zoom lens further comprises an aperture stop arranged in the image side with respect to the fourth lens unit, in which the one or two second lens units are configured to move toward the image side for zooming from a wide angle end to a telephoto end, and the one or two third lens units are configured to move along a locus convex toward the object side for zooming, and in which conditional expressions $$0.25 < L1/LSP < 0.7;\text{ and}$$

$$0.05 < M4m/M2 < 0.5,$$

are satisfied where LSP represents a distance between a surface of the one or two first lens units closest to the object side and the aperture stop, L1 represents a length of the one or two first lens units in an optical axis direction, M2 represents an amount of movement from the wide angle end to the telephoto end of a lens unit closer to the object side in the one or two second lens units, and M4m represents an amount of movement of the fourth lens unit from the wide angle end to an intermediate zoom state in which the one or two second lens units and the one or two third lens units are closest to each other.

Further features of the present invention will become apparent from the following description of exemplary embodiments with reference to the attached drawings.

BRIEF DESCRIPTION OF THE DRAWINGS

FIG. 6A shows aberration diagrams of the zoom lens according to Embodiment 3 at the wide angle end.

FIG. 6B shows aberration diagrams of the zoom lens according to Embodiment 3 at the telephoto end.

FIG. 10A shows aberration diagrams of the zoom lens according to Embodiment 5 at the wide angle end.

FIG. 10B shows aberration diagrams of the zoom lens according to Embodiment 5 at the telephoto end.

DESCRIPTION OF THE EMBODIMENTS

Figure 1:
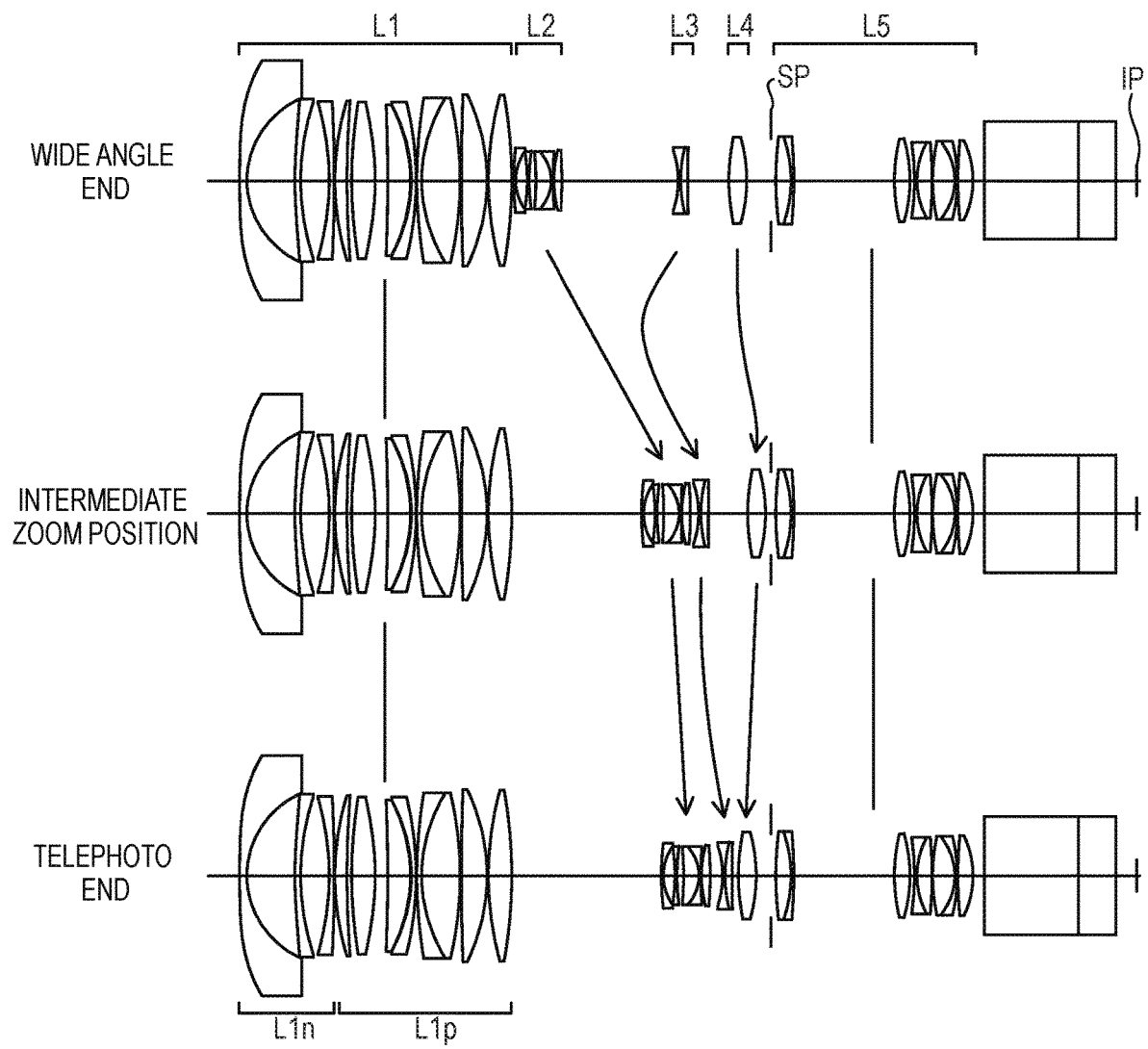
FIG. 1 shows lens cross-sectional views of a zoom lens according to Embodiment 1 of the present invention at a wide angle end, an intermediate zoom state, and a telephoto end.

Hereinafter, exemplary embodiments of the present invention are described in detail with reference to the accompanying drawings.

A zoom lens according to each Embodiment of the present invention includes, in order from an object side to an image side, a first lens unit having a positive refractive power, a second lens unit having a negative refractive power, a third lens unit, a fourth lens unit having a positive refractive power, a fifth lens unit, and an aperture stop, which is arranged in the image side with respect to the fourth lens unit. An interval between each pair of adjacent lens units is changed for zooming. The first lens unit includes a lens unit arranged closest to the object side and configured not to move for zooming, and includes one or two lens units having a positive refractive power, respectively. The second lens unit includes one or two lens units having a negative refractive power, which are configured to move toward the image side for zooming from a wide angle end to a telephoto end. The third lens unit includes a lens unit having a negative refractive power, which is arranged closest to the object side, and the third lens unit includes one or two lens units configured to move for zooming, which include a lens unit configured to move along a locus convex toward the object side for zooming. The fourth lens unit is configured to move for zooming. The fifth lens unit is configured not to move for zooming. With this configuration, it is possible to construct a zoom lens having a high zoom ratio.

The fourth lens unit is configured to move toward the image side during zooming from the wide angle end to a zoom position (this zoom position referred to herein as "intermediate zoom state") at which the second lens unit and the third lens unit are closest to each other. This allows the lens diameter of the first lens unit to be reduced. Further, the total length of the zoom lens is reduced by avoiding interference between the two negative lens units in the intermediate zoom state.

The zoom lens according to each Embodiment of the present invention satisfies the following conditional expression:

$$0.25 < L1/LSP < 0.7; \tag{1}$$

and $$0.05 < M4m/M2 < 0.5, \tag{2}$$

where LSP represents a distance between a surface of the first lens unit closest to the object side and an aperture stop surface, L1 represents a length of the first lens unit in an optical axis direction, M2 represents an amount of movement of the second lens unit from the wide angle end to the telephoto end, and M4m represents an amount of movement of the fourth lens unit during zooming from the wide angle end to the intermediate zoom state in which the second lens unit and the third lens unit are closest to each other.

The conditional expression (1) defines a length of the first lens unit. When the total length of the first lens unit becomes longer so as to cause the value of L1/LSP to be larger than the lower limit value of the conditional expression (1), the lens diameter of the first lens unit is determined by an off-axial ray at the wide angle end. In view of this, it is possible to reduce the off-axial ray to reduce the lens diameter of the first lens unit by appropriately arranging the positive fourth lens unit, which is arranged in front of the aperture stop at the wide angle end. In contrast, when the value of L1/LSP exceeds the upper limit value of the conditional expression (1), the total lens length becomes disadvantageously longer.

The conditional expression (2) defines the amount of movement of the fourth lens unit. When the position of the fourth lens unit at the wide angle end becomes away from the aperture stop so as to cause the value of M4m/M2 to be larger than the lower limit value of the conditional expression (2), it is possible to reduce the lens diameter of the first lens unit. In contrast, when the value of M4m/M2 exceeds the upper limit value of the conditional expression (2), variation of aberrations due to zooming becomes larger, resulting in deterioration of the optical performance.

It is more preferred to set the numerical ranges of the conditional expressions (1) and (2) as follows.

$$0.3 < L1/LSP < 0.6 \tag{1a}$$

$$0.1 < M4m/M2 < 0.3 \tag{2a}$$

Further, it is desired to satisfy the following conditional expression:

$$-0.3 < M4mt/M2 < 0 \tag{3},$$

where M4mt represents an amount of movement of the fourth lens unit from the intermediate zoom state to the telephoto end.

The conditional expression (3) defines the amount of movement of the positive lens unit from the zoom position at which the second lens unit and the third lens unit are closest to each other to the telephoto end. Variation in field curvature is corrected by moving the positive lens unit toward the object side from the intermediate zoom state to the telephoto end. When the value of M4mt/M2 exceeds the upper limit value of the conditional expression (3), variation of field curvature from the intermediate zoom state to the telephoto end becomes larger, resulting in deterioration of the optical performance. In contrast, when the value of M4mt/M2 falls below the lower limit value of the conditional expression (3), variation of field curvature is corrected excessively, resulting in deterioration of the optical performance.

It is more preferred to set the numerical range of the conditional expression (3) as follows.

$$-0.2 < M4mt/M2 < 0 \tag{3a},$$

Further, it is desired to satisfy the following conditional expression:

$$fw/X < 0.65 \tag{4},$$

where "fw" represents a focal length of the zoom lens at the wide angle end, and X represents a diagonal length of an image size. When the value of the conditional expression (4) exceeds the upper limit value thereof, the focal length at the wide angle end becomes larger, and the lens diameter of the first lens unit is determined by a ray other than that at the wide angle end. As a result, an effect of reducing the lens diameter of the first lens unit is reduced.

It is more preferred to set the numerical range of the conditional expression (4) as follows.

$$fw/X < 0.5 \tag{4a}$$

Further, the first lens unit consists of, in order from the object side to the image side, a negative lens subunit having a negative refractive power and a positive lens subunit having a positive refractive power. It is desired to satisfy the following conditional expression:

$$-f1n/f1 < 0.9 \tag{5},$$

where f1n represents a focal length of the negative lens subunit, and f1 represents a focal length of the first lens unit. In this case, it is assumed that the number of lenses constructing the negative lens subunit is one-third or less of the number of lenses constructing the first lens unit. When the value of the conditional expression (5) exceeds the upper limit value thereof, the focal length at the wide angle end becomes larger, and the lens diameter of the first lens unit is determined by a ray other than that at the wide angle end. As a result, the effect of reducing the lens diameter of the first lens unit is reduced.

Regarding the description of the conditional expression (5), it is assumed that the negative lens subunit and the positive lens subunit are not defined by an interval between lens surfaces, which changes due to movement for zooming or focus adjustment, but simply indicate one or more lenses arranged continuously in the optical axis direction. Further, the number of lenses constructing the negative lens subunit is one-third or less of the number of lenses constructing the first lens unit.

It is more preferred to set the numerical range of the conditional expression (5) as follows.

$$-f1n/f1<0.8 \quad (5a)$$

Further, the fourth lens unit is preferred to include an aspherical surface. Inclusion of an aspherical surface enables variation of the optical performance due to zooming to be suppressed.

Figure 11:
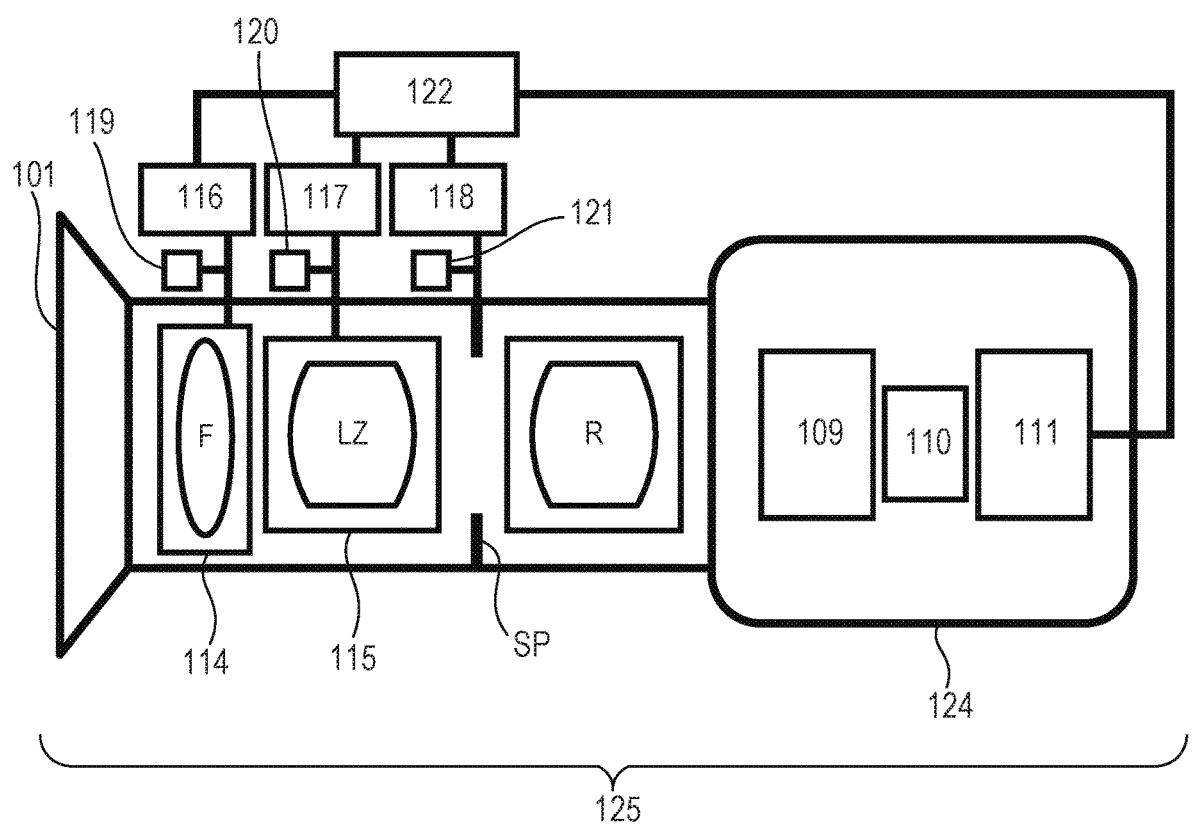
FIG. 11 is a schematic view of a main part of an image pickup apparatus according to an Embodiment of the present invention.

FIG. 11 is a schematic view of a main part of an image pickup apparatus (television camera system) using the zoom lens according to each of Embodiments 1 to 5 as a photographing optical system. FIG. 11 is an illustration of the zoom lens according to any one of Embodiments 1 to 5, which is denoted by 101, and a camera 124. The zoom lens 101 is configured to be detachably attachable to the camera 124. An image pickup apparatus 125 is formed by attaching the zoom lens 101 to the camera 124. The zoom lens 101 includes a first lens unit F, an intermediate lens unit LZ, and a last lens unit R for forming an image. The first lens unit F includes a lens unit for focusing, which is configured to move on an optical axis for focusing.

The intermediate lens unit LZ includes a movable lens unit configured to move on the optical axis for zooming in each of Embodiments 1 to 5. The aperture stop is denoted by SP. Driving mechanisms 114 and 115, such as helicoids and cams, are configured to drive the focus lens unit and the intermediate lens unit LZ in the optical axis direction, respectively.

Motors (driving units) 116 to 118 are configured to electrically drive the driving mechanisms 114 and 115 and the aperture stop SP, respectively. Detectors 119 to 121, such as encoders, potentiometers, or photosensors, are configured to detect positions of the focus lens unit and the intermediate lens unit LZ on the optical axis, and the aperture diameter of the aperture stop SP, respectively. The camera 124 includes a glass block 109, which corresponds to an optical filter in the camera 124, and a solid-state image pickup element (photoelectric conversion element) 110, such as a charge coupled device (CCD) sensor or a complementary metal oxide semiconductor (CMOS) sensor, which is configured to receive an object image formed by the zoom lens 101.

Moreover, central processing units (CPUs) 111 and 122 are configured to control various kinds of driving of the camera 124 and the zoom lens 101. As described above, the zoom lens according to each Embodiment of the present invention is applied to a television camera to achieve an image pickup apparatus having high optical performance.

The exemplary Embodiments of the present invention have been described above. However, it is to be understood that the present invention is not limited to Embodiments, and various modifications and changes can be made without departing from the spirit of the present invention.

Now, features of a lens configuration of a zoom lens according to each of Numerical Embodiments 1 to 5 (Embodiments 1 to 5) of the present invention are described. In the lens cross-sectional view of each Embodiment, an image plane I corresponds to an image pickup surface of a solid-state image pickup element. In the following, the description is given based on the assumption that, in the lens configuration, lenses are arranged in order from the object side to the image side, unless otherwise stated.

Embodiment 1

Now, a zoom lens according to Embodiment 1 of the present invention is described with reference to FIG. 1, FIG. 2A, and FIG. 2B.

Figure 2A:
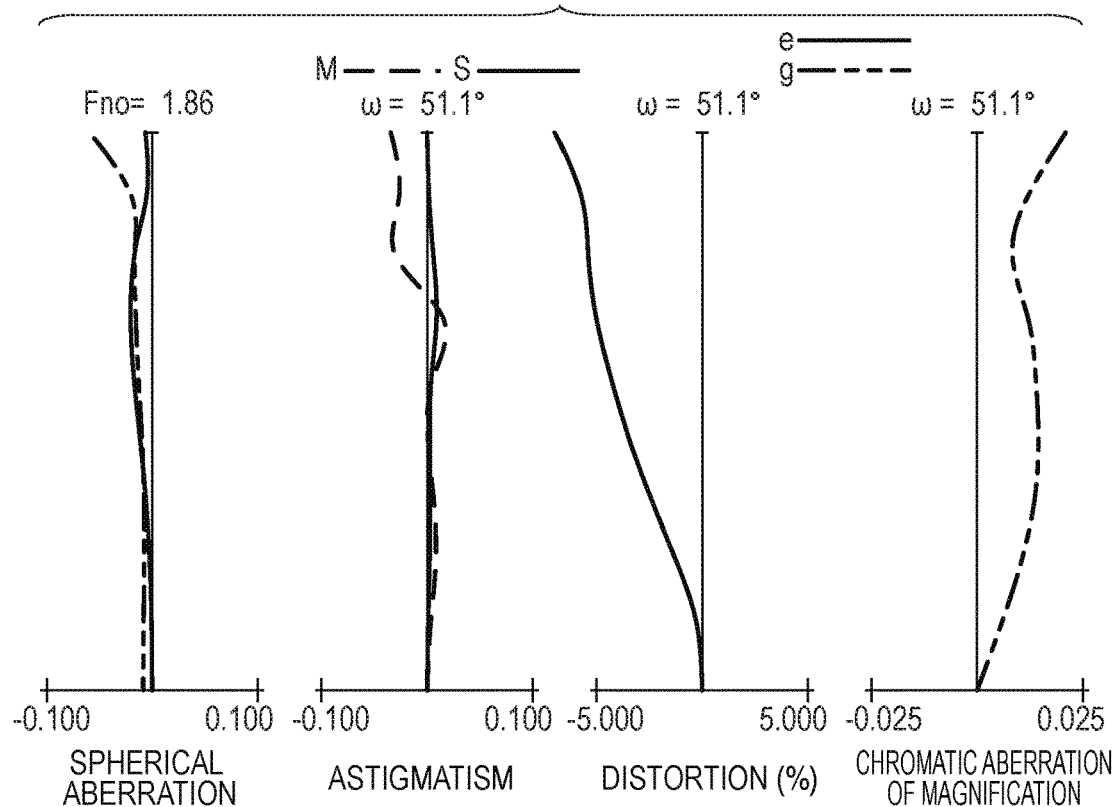
FIG. 2A shows aberration diagrams of the zoom lens according to Embodiment 1 at the wide angle end.
Figure 2B:
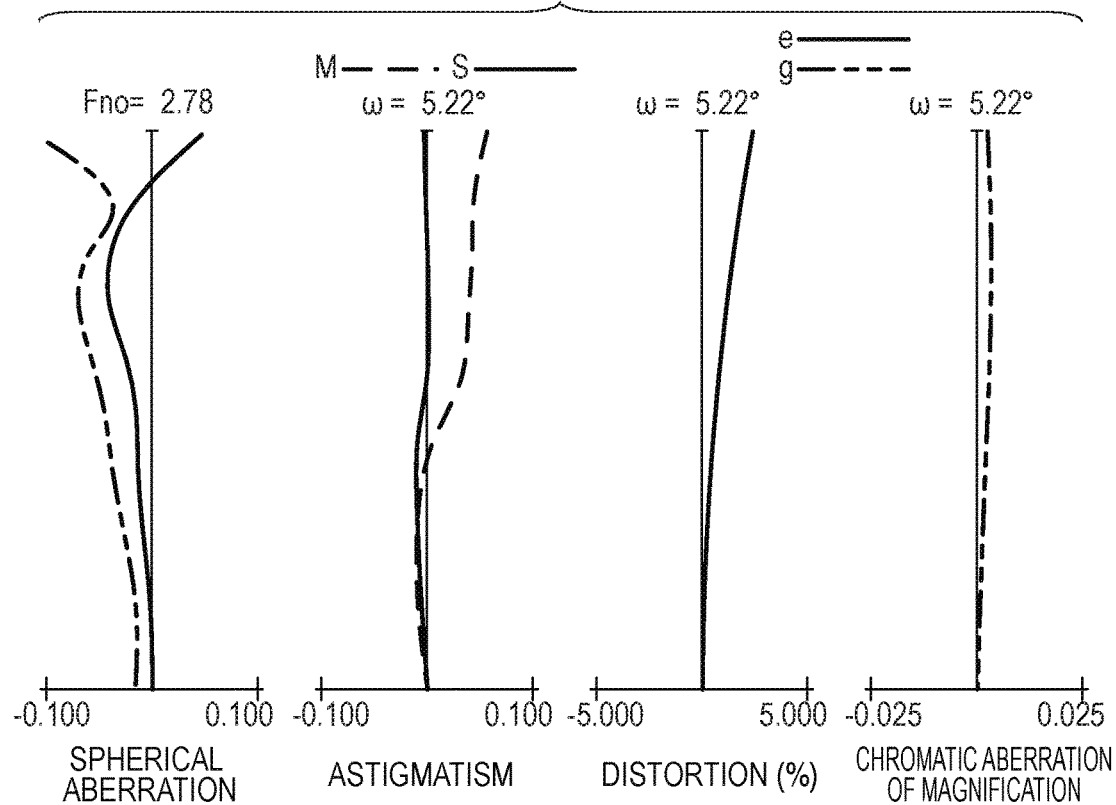
FIG. 2B shows aberration diagrams of the zoom lens according to Embodiment 1 at the telephoto end.

FIG. 1 shows lens cross-sectional views of the zoom lens according to Embodiment 1 at a wide angle end, an intermediate zoom state, and a telephoto end. FIG. 2A and FIG. 2B show aberration diagrams of the zoom lens according to Embodiment 1 at the wide angle end and the telephoto end, respectively.

A first lens unit L1, a fifth lens unit L5, and an aperture stop SP are configured not to move for zooming. During zooming from the wide angle end to the telephoto end, a second lens unit L2, which serves as a main zooming lens unit having a negative refractive power, is configured to move toward the image side, and a third lens unit L3 having a negative refractive power is configured to move along a locus convex toward the object side.

A fourth lens unit L4 has a positive refractive power, and is configured to move toward the image side in the intermediate zoom state in which the second lens unit and the third lens unit are closest to each other, compared to a position at the wide angle end, and then move toward the object side to reach the telephoto end.

Regarding the description of the conditional expression (5), in Embodiment 1, the first lens unit L1 consists of, in order from the object side to the image side, a negative lens subunit L1n having a negative refractive power and consisting of three negative lenses (first surface to sixth surface), and a positive lens subunit L1p having a positive refractive power and consisting of eight lenses (seventh surface to 21st surface). The negative lens subunit L1n consists of at least one negative lens closer to the object side than a positive lens closest to the object side in the first lens unit L1. Preferably a number of the at least one negative lens is not greater than one third of a number of lenses included in the first lens unit L1. The positive lens subunit L1p consists of all lens or lenses in the first lens unit L1 other than the negative lens subunit L1n. The definitions of the negative lens subunit L1n and the positive lens subunit L1p are the same for the following Embodiments.

Corresponding values of each of the conditional expressions of Embodiment 1 are shown in Table 1. Numerical Embodiment 1 satisfies every conditional expression, and achieves a zoom lens enabling both of downsizing of the lens and satisfactory optical performance that suppresses aberration variation at the time of zooming.

Embodiment 2

Figure 3:
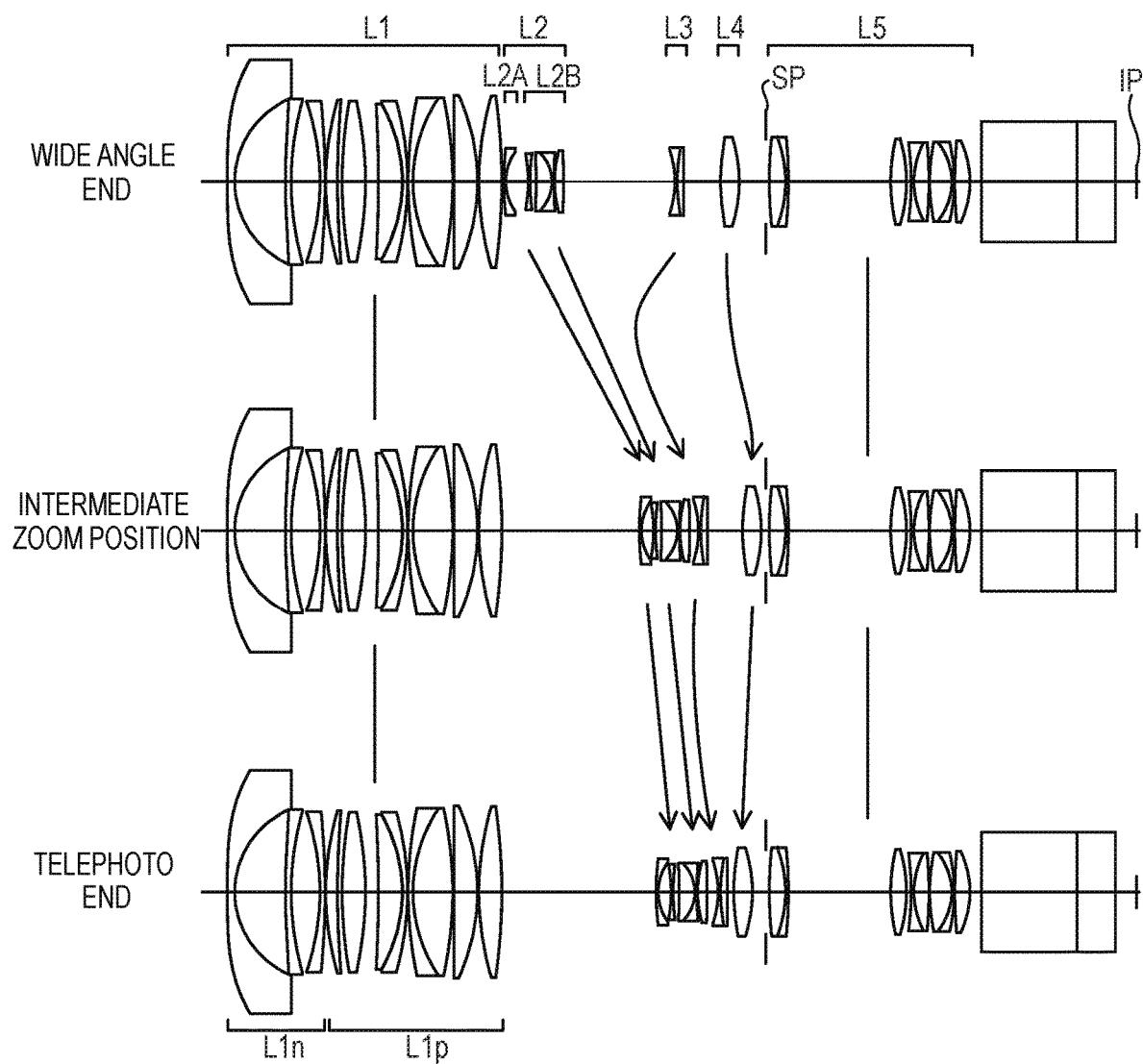
FIG. 3 shows lens cross-sectional views of a zoom lens according to Embodiment 2 of the present invention at a wide angle end, an intermediate zoom state, and a telephoto end.
Figure 4A:
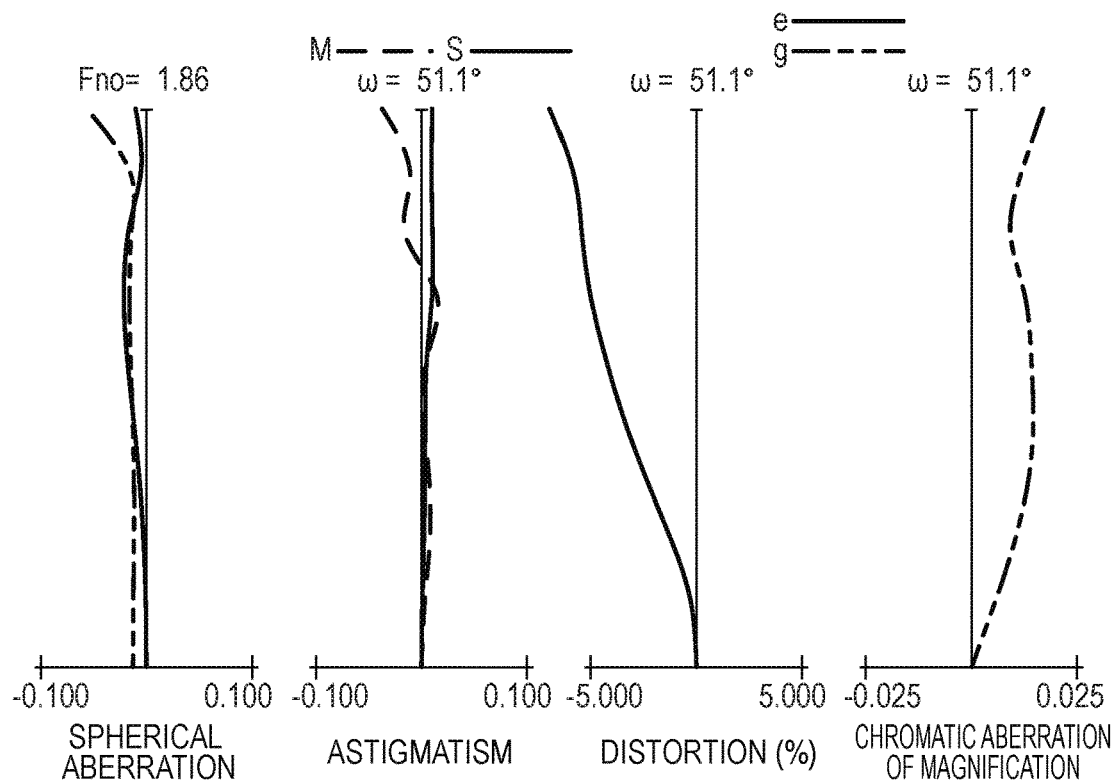
FIG. 4A shows aberration diagrams of the zoom lens according to Embodiment 2 at the wide angle end.
Figure 4B:
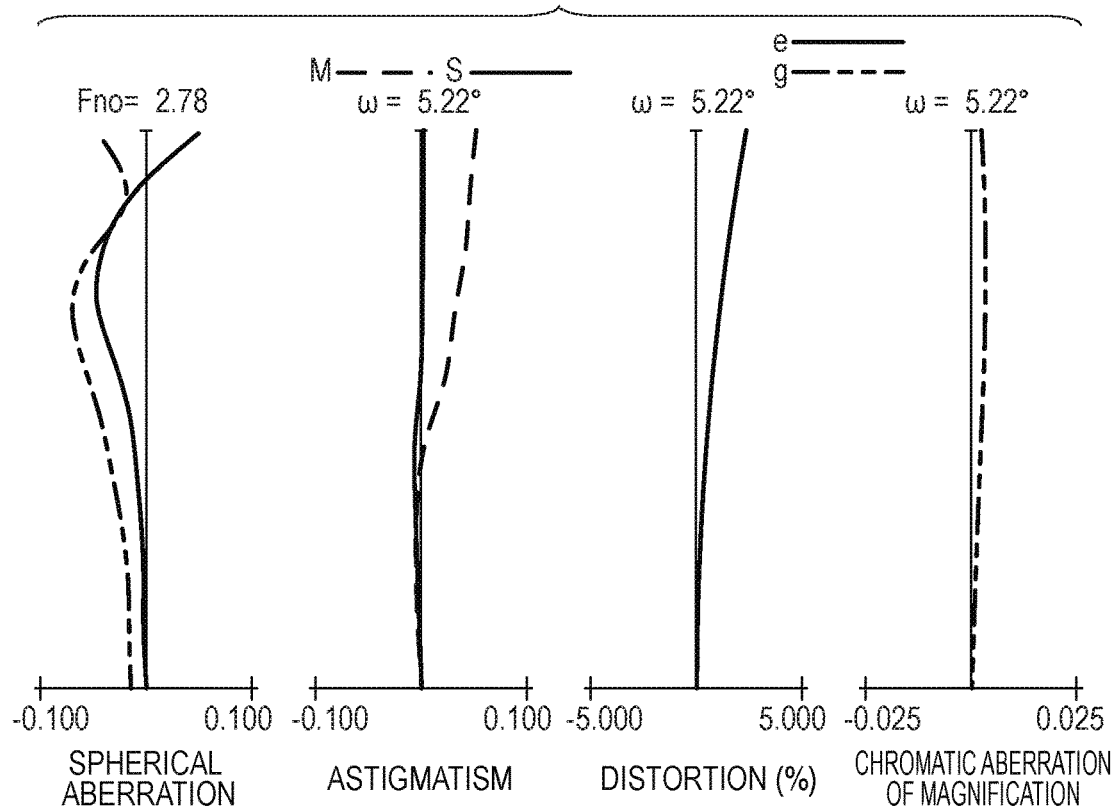
FIG. 4B shows aberration diagrams of the zoom lens according to Embodiment 2 at the telephoto end.

Now, a zoom lens according to Embodiment 2 of the present invention is described reference to FIG. 3, FIG. 4A, and FIG. 4B.

FIG. 3 shows lens cross-sectional views of the zoom lens according to Embodiment 2 at a wide angle end, an intermediate zoom state, and a telephoto end. FIG. 4A and FIG.

4B show aberration diagrams of the zoom lens according to Embodiment 2 at the wide angle end and the telephoto end, respectively.

A first lens unit L1, a fifth lens unit L5, and an aperture stop SP are configured not to move for zooming. During zooming from the wide angle end to the telephoto end, a second lens unit L2, which serves as a main zooming lens unit having a negative refractive power, is configured to move toward the image side. The second lens unit consists of a lens subunit L2A and a lens subunit L2B in order from the object side to the image side, and an interval between the lens subunit L2A and the lens subunit L2B is minutely changed during zooming. The amount of change of the interval between the lens subunits is 3.24 mm, which is not greater than 0.2 times of the total lens length of 314.60 mm. A third lens unit L3 having a negative refractive power is configured to move along a locus convex toward the object side for zooming.

A fourth lens unit L4 has a positive refractive power, and is configured to move toward the image side in the intermediate zoom state in which the second lens unit and the third lens unit are closest to each other, compared to a position at the wide angle end, and then move toward the object side to reach the telephoto end.

Regarding the description of the conditional expression (5), in Embodiment 2, the first lens unit L1 consists of, in order from the object side to the image side, a negative lens subunit L1n having a negative refractive power and consisting of three negative lenses (first surface to sixth surface), and a positive lens subunit L1p having a positive refractive power and consisting of eight lenses (seventh surface to 21st surface).

Corresponding values of each of the conditional expressions of Embodiment 2 are shown in Table 1. Numerical Embodiment 2 satisfies every conditional expression, and achieves a zoom lens enabling both of downsizing of the lens and satisfactory optical performance that suppresses aberration variation at the time of zooming.

Embodiment 3

Now, a zoom lens according to Embodiment 3 of the present invention is described with reference to FIG. 5, FIG. 6A, and FIG. 6B.

Figure 5:
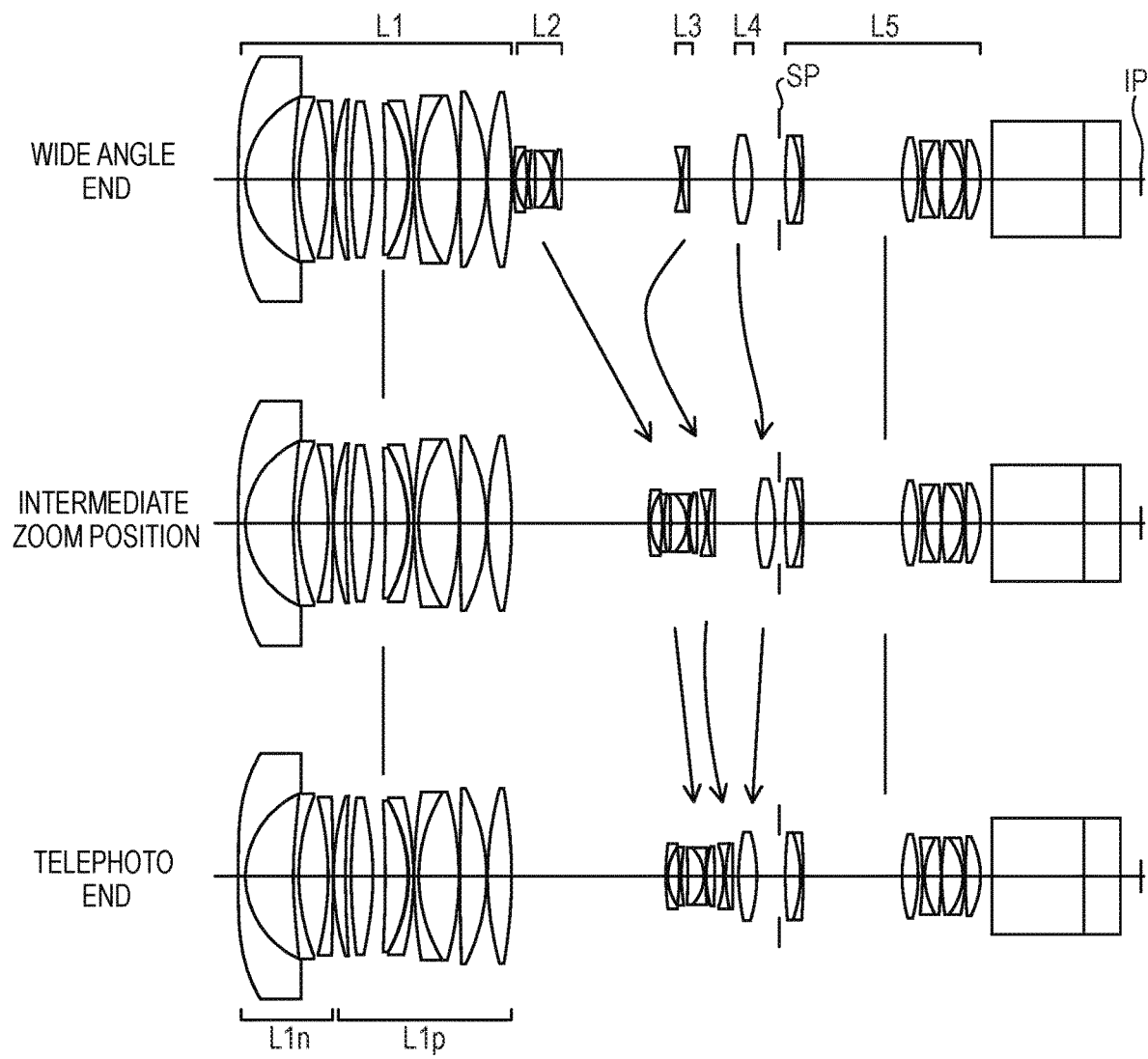
FIG. 5 shows lens cross-sectional view of a zoom lens according to Embodiment 3 of the present invention at a wide angle end, an intermediate zoom state, and a telephoto end.

FIG. 5 shows lens cross-sectional views of the zoom lens according to Embodiment 3 at a wide angle end, an intermediate zoom state, and a telephoto end. FIG. 6A and FIG. 6B show aberration diagrams of the zoom lens according to Embodiment 3 at the wide angle end and the telephoto end, respectively.

A first lens unit L1, a fifth lens unit L5, and an aperture stop SP are configured not to move for zooming. During zooming from the wide angle end to the telephoto end, a second lens unit L2, which serves as a main zooming lens unit having a negative refractive power, is configured to move toward the image side, and a third lens unit L3 having a negative refractive power is configured to move along a locus convex toward the object side.

A fourth lens unit L4 has a positive refractive power, and is configured to move toward the image side in the intermediate zoom state in which the second lens unit and the third lens unit are closest to each other, compared to a position at the wide angle end, and then move toward the object side to reach the telephoto end.

Regarding the description of the conditional expression (5), in Embodiment 3, the first lens unit L1 consists of, in order from the object side to the image side, a negative lens subunit L1n having a negative refractive power and consisting of three negative lenses (first surface to sixth surface), and a positive lens subunit L1p having a positive refractive power and consisting of eight lenses (seventh surface to 21st surface).

Corresponding values of each of the conditional expressions of Embodiment 3 are shown in Table 1. Numerical Embodiment 3 satisfies every conditional expression, and achieves a zoom lens enabling both of downsizing of the lens and satisfactory optical performance that suppresses aberration variation at the time of zooming.

Embodiment 4

Now, a zoom lens according to Embodiment 4 of the present invention is described with reference to FIG. 7, FIG. 8A, and FIG. 8B.

Figure 7:
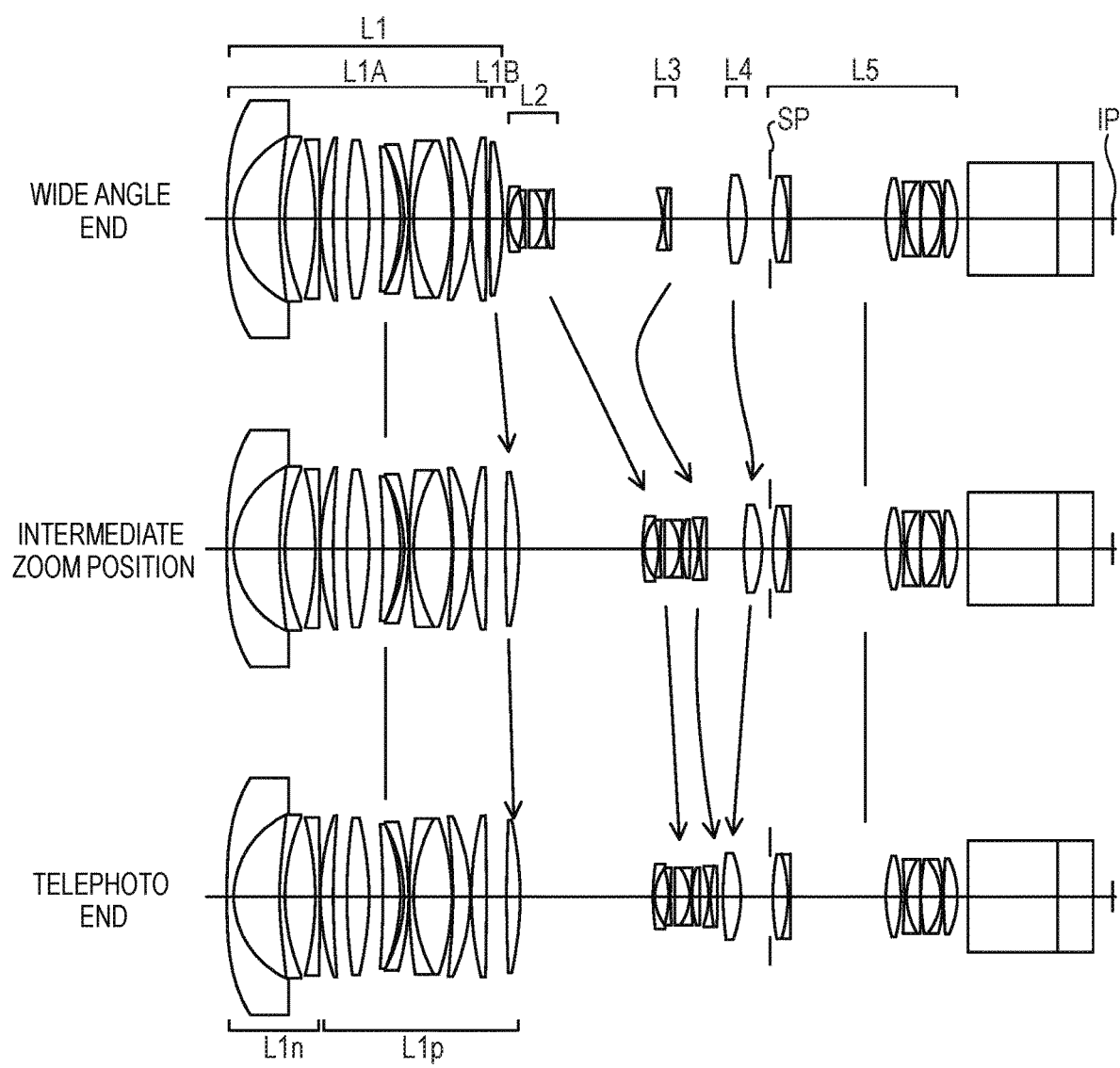
FIG. 7 shows lens cross-sectional views of a zoom lens according to Embodiment 4 of the present invention at a wide angle end, an intermediate zoom state, and a telephoto end.
Figure 8A:
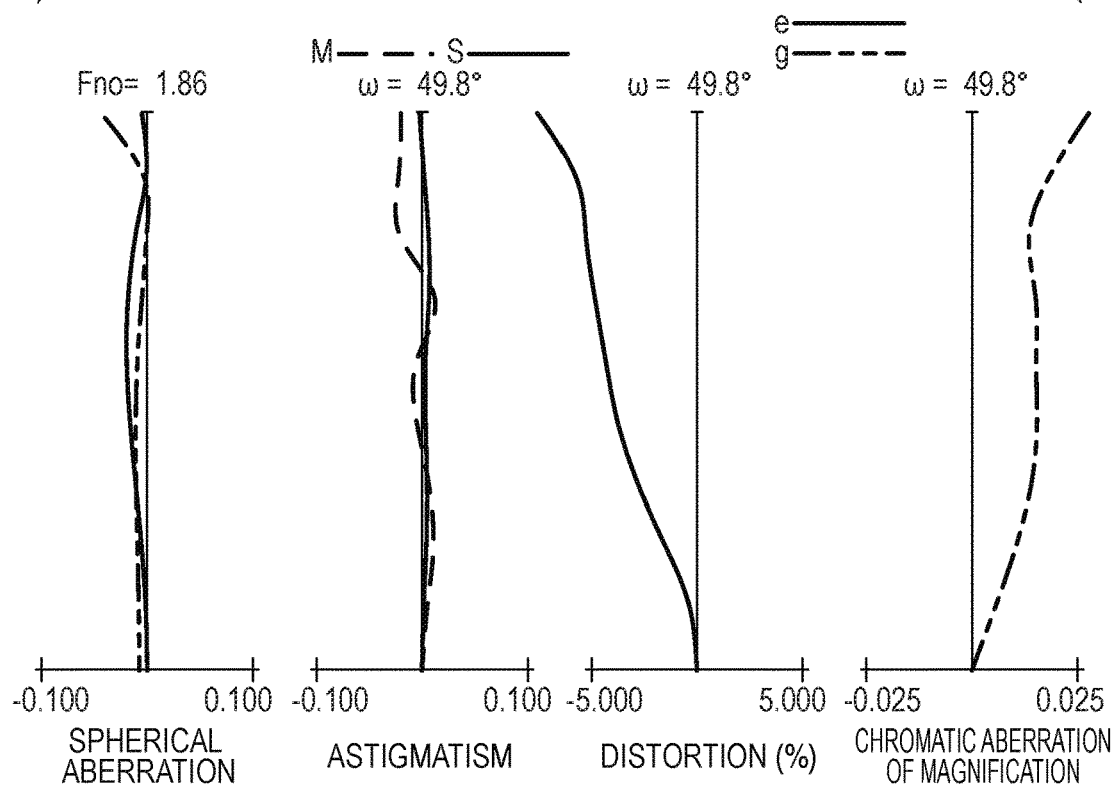
FIG. 8A shows aberration diagrams of the zoom lens according to Embodiment 4 at the wide angle end.
Figure 8B:
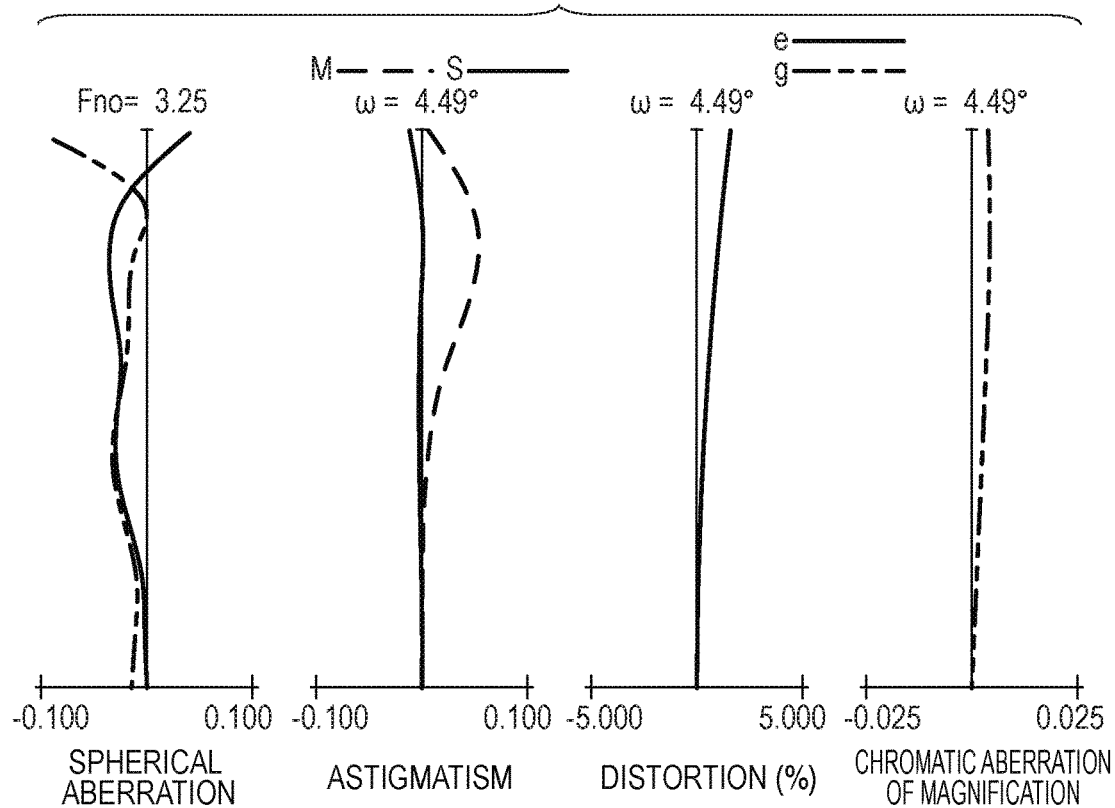
FIG. 8B shows aberration diagrams of the zoom lens according to Embodiment 4 at the telephoto end.

FIG. 7 shows lens cross-sectional views of the zoom lens according to Embodiment 4 at a wide angle end, an intermediate zoom state, and a telephoto end. FIG. 8A and FIG. 8B show aberration diagrams of the zoom lens according to Embodiment 4 at the wide angle end and the telephoto end, respectively.

A first lens unit L1, a fifth lens unit L5, and an aperture stop SP are configured not to move for zooming. The first lens unit consists of a lens subunit L1A and a lens subunit L1B in order from the object side to the image side, and an interval between the lens subunit L1A and the lens subunit L1B is minutely changed during zooming. The amount of change of the interval between the lens subunits is 6.44 mm, which is not greater than 0.2 times of the total lens length of 328.65 mm. During zooming from the wide angle end to the telephoto end, a second lens unit L2, which serves as a main zooming lens unit having a negative refractive power, is configured to move toward the image side. A third lens unit L3 having a negative refractive power is configured to move along a locus convex toward the object side for zooming.

A fourth lens unit L4 has a positive refractive power, and is configured to move toward the image side in the intermediate zoom state in which the second lens unit and the third lens unit are closest to each other, compared to a position at the wide angle end, and then move toward the object side to reach the telephoto end.

Regarding the description of the conditional expression (5), in Embodiment 4, the first lens unit L1 consists of, in order from the object side to the image side, a negative lens subunit L1n having a negative refractive power and consisting of three negative lenses (first surface to sixth surface), and a positive lens subunit L1p having a positive refractive power and consisting of nine lenses (seventh surface to 23rd surface).

Corresponding values of each of the conditional expressions of Embodiment 4 are shown in Table 1. Numerical Embodiment 4 satisfies every conditional expression, and achieves a zoom lens enabling both of downsizing of the lens and satisfactory optical performance that suppresses aberration variation at the time of zooming.

Embodiment 5

Now, a zoom lens according to Embodiment 5 of the present invention is described with reference to FIG. 9, FIG. 10A, and FIG. 10B.

Figure 9:
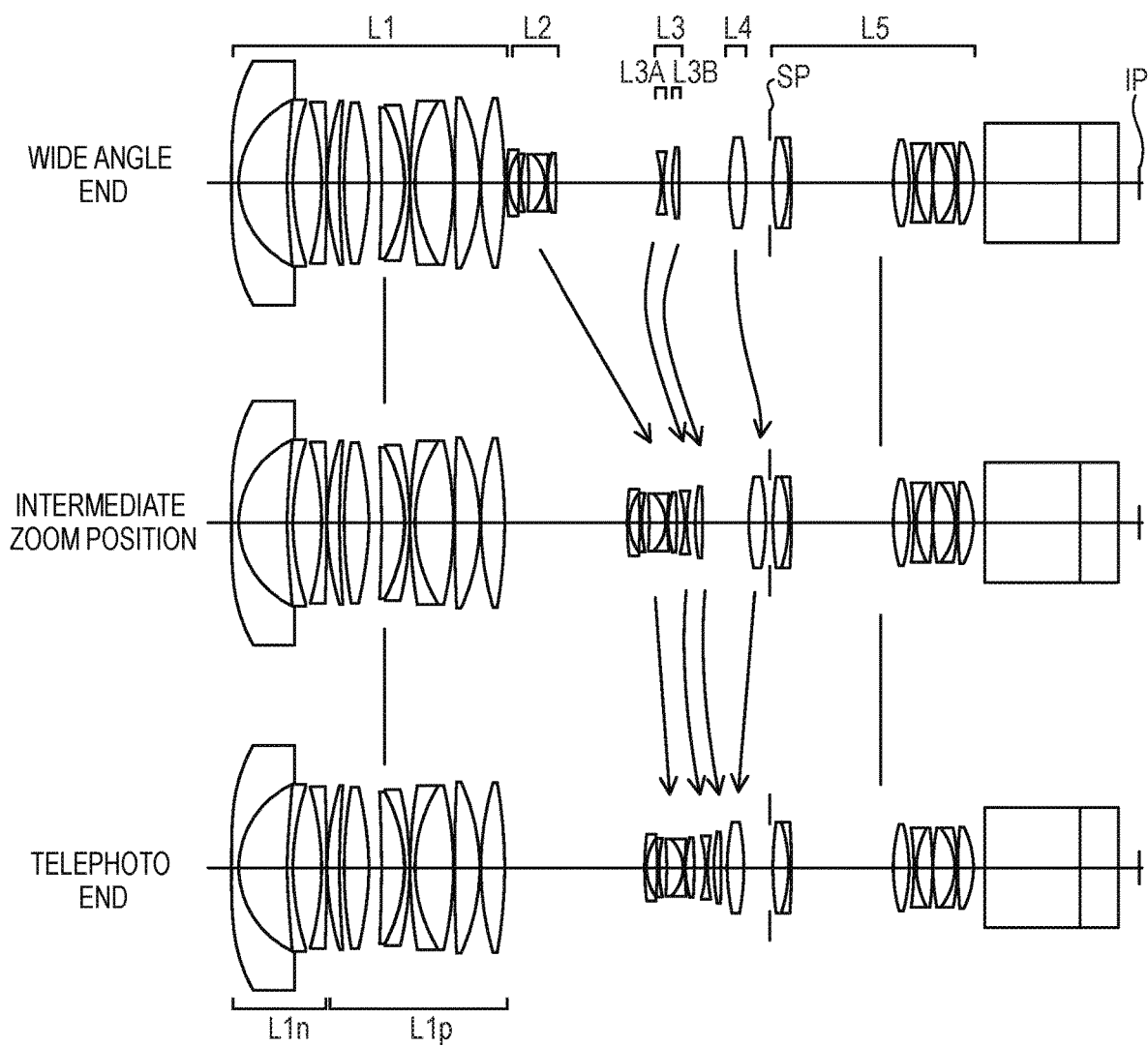
FIG. 9 shows lens cross-sectional views of a zoom lens according to Embodiment 5 of the present invention at a wide angle end, an intermediate zoom state, and a telephoto end.

FIG. 9 shows lens cross-sectional views of the zoom lens according to Embodiment 5 at a wide angle end, an intermediate zoom state, and a telephoto end. FIG. 10A and FIG.

10B show aberration diagrams of the zoom lens according to Embodiment 5 at the wide angle end and the telephoto end, respectively.

A first lens unit L1, a fifth lens unit L5, and an aperture stop SP are configured not to move for zooming. During zooming from the wide angle end to the telephoto end, the second lens unit L2, which serves as a main zooming lens unit having a negative refractive power, is configured to move toward the image side. The third lens unit L3 consists of, in order from the object side to the image side, a lens subunit L3A having a negative refractive power and a lens subunit L3B having a positive refractive power, and is configured to move along a locus convex toward the object side for zooming.

A fourth lens unit L4 has a positive refractive power, and is configured to move toward the image side in the intermediate zoom state in which the second lens unit and the third lens unit are closest to each other, compared to a position at the wide angle end, and then move toward the object side to reach the telephoto end.

Regarding the description of the conditional expression (5), in Embodiment 5, the first lens unit L1 consists of, in order from the object side to the image side, a negative lens subunit L1n having a negative refractive power and consisting of three negative lenses (first surface to sixth surface), and a positive lens subunit L1p having a positive refractive power and consisting of eight lenses (seventh surface to 21st surface).

Corresponding values of each of the conditional expressions of Embodiment 5 are shown in Table 1. Numerical Embodiment 5 satisfies every conditional expression, and achieves a zoom lens enabling both of downsizing of the lens and satisfactory optical performance that suppresses aberration variation at the time of zooming.

Embodiments have been described by taking examples of Numerical Embodiment in which the first to third lens units each include one lens unit, and Numerical Embodiment in which any one of the first to third lens units include two lens units and the other two lens units each include one lens unit. However, the present invention is not limited to this. Two or more lens units of the first to third lens units may each include two lens units.

The exemplary embodiments of the present invention are described above, but the present invention is not limited to those embodiments and can be modified and changed variously within the scope of the gist thereof.

Next, Numerical Embodiments 1 to 5 corresponding to Embodiments 1 to 5 of the present invention are shown. In each Numerical Embodiment, the position of a surface in the order from the object side is represented by "i". A curvature radius of the i-th lens surface in the order from the object side is represented by "ri", a lens thickness or an air interval between the i-th lens surface and the (i+1)th lens surface in the order from the object side are represented by "di", and a refractive index and an Abbe number of a material of a lens between the i-th lens surface and the (i+1)th lens surface in the order from the object side are represented by "ndi" and "vdi", respectively. Symbol BF represents a back focus by an air-equivalent distance from the last surface to the image plane. The total lens length is a distance from the first lens surface to the image pickup surface.

When an X axis is set in the optical axis direction, an H axis is set in a direction perpendicular to the optical axis, a direction of travel of light is defined as positive, a paraxial curvature radius is represented by R, and aspherical coefficients are represented by K, A2, A3, A4, A5, A6, A7, A8, A9, A10, A11, A12, A13, A14, A15, and A16, an aspherical shape is expressed as the following expression.

$$X = \frac{\left(\frac{1}{R}\right)}{1+\sqrt{1-(1+K)\left(\frac{H}{R}\right)^2}} + A2H^2 + A3H^3 + A4H^4 + A5H^5 + A6H^6 + A7H^7 + A8H^8 + A9H^9 + A10H^{10} + A11H^{11} + A12H^{12} + A13H^{13} + A14H^{14} + A15H^{15} + A16H^{16}$$

In each aspherical shape, [e-X] represents [×10$^{-X}$]. A half angle of view of the entire system and an image height being a maximum image height for determining a half angle of view are shown in addition to the specifications including the focal length and the f-number. Further, each lens unit data indicates the focal length of each lens unit. Further, an interval "d" of each optical surface that is indicated by "(variable)" changes for zooming, and a surface interval that depends on each focal length is shown in another table.

An abbe number "vd" is defined by the following expression:

$vd=(nd-1)/(nF-nC)$, where nF represents a refractive index with respect to an F-line, "nd" represents a refractive index with respect to a d-line, and nC represents a refractive index with respect to a C-line.

(Numerical Embodiment 1)
Unit: mm
Surface data

| Surface number | r | d | nd | vd |
|---|---|---|---|---|
| 1* | 1,918.222 | 2.50 | 1.83481 | 42.7 |
| 2 | 30.936 | 17.09 | | |
| 3* | 159.855 | 2.00 | 1.83481 | 42.7 |
| 4 | 86.331 | 10.04 | | |
| 5 | −94.827 | 1.80 | 1.83481 | 42.7 |
| 6 | −527.011 | 0.15 | | |
| 7 | 94.270 | 4.26 | 1.92286 | 18.9 |
| 8 | 347.768 | 1.67 | | |
| 9 | 164.790 | 8.26 | 1.60300 | 65.4 |
| 10* | −99.054 | 4.41 | | |
| 11 | −604.301 | 8.00 | 1.43387 | 95.1 |
| 12 | −55.085 | 0.30 | | |
| 13 | −53.196 | 1.70 | 1.80000 | 29.8 |
| 14 | −110.385 | 0.18 | | |
| 15 | 169.977 | 1.70 | 1.91650 | 31.6 |
| 16 | 53.615 | 13.56 | 1.43875 | 94.7 |
| 17 | −122.220 | 0.40 | | |
| 18 | 861.296 | 9.06 | 1.43387 | 95.1 |
| 19 | −67.470 | 0.40 | | |
| 20 | 111.203 | 8.23 | 1.76385 | 48.5 |
| 21 | −166.639 | (Variable) | | |
| 22 | 96.566 | 0.70 | 2.00100 | 29.1 |
| 23 | 17.507 | 4.07 | | |
| 24 | −61.457 | 0.70 | 1.43875 | 94.7 |
| 25 | 70.548 | 2.33 | | |
| 26 | −109.228 | 5.39 | 1.85478 | 24.8 |
| 27 | −14.852 | 0.70 | 1.88300 | 40.8 |
| 28 | 171.286 | 0.21 | | |
| 29 | 40.389 | 3.04 | 1.64769 | 33.8 |
| 30 | −122.593 | (Variable) | | |
| 31 | −32.417 | 0.80 | 1.72916 | 54.7 |
| 32 | 45.308 | 2.57 | 1.84666 | 23.8 |
| 33 | 1,466.077 | (Variable) | | |
| 34* | 66.039 | 6.29 | 1.58913 | 61.1 |
| 35 | −54.493 | (Variable) | | |

(Numerical Embodiment 1)
Unit: mm
Surface data

| Surface number | r | d | nd | νd |
|---|---|---|---|---|
| 36 (Stop) | ∞ | 1.84 | | |
| 37 | 122.970 | 5.35 | 1.51742 | 52.4 |
| 38 | −46.108 | 1.00 | 1.83481 | 42.7 |
| 39 | −164.538 | 35.50 | | |
| 40 | 61.903 | 5.47 | 1.63980 | 34.5 |
| 41 | −51.062 | 1.55 | | |
| 42 | −91.972 | 0.90 | 1.88300 | 40.8 |
| 43 | 27.882 | 5.27 | 1.48749 | 70.2 |
| 44 | −141.929 | 0.20 | | |
| 45 | 61.770 | 7.82 | 1.43875 | 94.7 |

(Numerical Embodiment 1)
Unit: mm
Surface data

| Surface number | r | d | nd | νd |
|---|---|---|---|---|
| 46 | −21.051 | 0.90 | 2.00100 | 29.1 |
| 47 | −54.423 | 0.13 | | |
| 48 | 141.825 | 5.35 | 1.48749 | 70.2 |
| 49 | −31.912 | 4.00 | | |
| 50 | ∞ | 33.00 | 1.60859 | 46.4 |
| 51 | ∞ | 13.20 | 1.51680 | 64.2 |
| 52 | ∞ | (Variable) | | |
| Image plane | ∞ | | | |

Aspherical Surface Data

First surface

K = 0.00000e+000   A4 = 3.89922e−006   A6 = 1.07694e−008   A8 = 7.79026e−012
A10 = 9.49367e−014   A12 = 1.11174e−016   A14 = 1.85192e−020   A16 = −6.14971e−026
A3 = 1.60188e−005   A5 = −1.68458e−007   A7 = −3.06230e−010   A9 = −1.17457e−012
A11 = −4.11466e−015   A13 = −1.90016e−018   A15 = −7.32479e−023

Third surface

K = 0.00000e+000   A4 = −2.18327e−006   A6 = −7.46601e−008   A8 = −7.11385e−010
A10 = −3.23420e−013   A12 = 1.59786e−015   A14 = −6.51605e−019   A16 = −2.04040e−022
A3 = −1.28010e−005   A5 = 4.37046e−007   A7 = 9.13598e−009   A9 = 3.03267e−011
A11 = −3.27268e−014   A13 = −1.78219e−017   A15 = 2.23023e−020

Tenth surface

K = 0.00000e+000   A4 = 1.08070e−006   A6 = 1.37549e−008   A8 = 2.71473e−010
A10 = 2.08368e−013   A12 = −7.68841e−016   A14 = 1.05285e−018   A16 = 2.18705e−022
A3 = −3.60136e−006   A5 = −1.77292e−008   A7 = −2.66936e−009   A9 = −1.44188e−011
A11 = 1.68104e−014   A13 = −4.82004e−018   A15 = −2.64010e−020

Thirty-fourth surface

K = −1.32879e+001   A4 = 1.73777e−006   A6 = −4.65336e−009   A8 = 2.82343e−012

Various Data

Zoom ratio 13.60

|  | Wide angle | Intermediate | Telephoto |
|---|---|---|---|
| Focal length | 4.43 | 28.02 | 60.25 |
| F-number | 1.86 | 1.86 | 2.78 |
| Half angle of view | 51.15 | 11.11 | 5.22 |
| Image height | 5.50 | 5.50 | 5.50 |
| Total lens length | 315.65 | 315.65 | 315.65 |
| BF | 7.45 | 7.45 | 7.45 |
| d21 | 0.65 | 45.75 | 52.71 |
| d30 | 40.88 | 2.90 | 4.40 |
| d33 | 14.36 | 13.83 | 2.11 |
| d35 | 8.35 | 1.76 | 5.02 |
| d52 | 7.45 | 7.45 | 7.45 |

Zoom lens unit data

| Unit | First surface | Focal length |
|---|---|---|
| 1 | 1 | 29.69 |
| 2 | 22 | −20.23 |
| 3 | 31 | −48.88 |
| 4 | 34 | 51.48 |
| 5 | 36 | 53.03 |

Numerical Embodiment 2

Unit: mm
Surface data

| Surface number | r | d | nd | vd |
|---|---|---|---|---|
| 1* | 1,624.476 | 2.50 | 1.83481 | 42.7 |
| 2 | 30.683 | 17.72 | | |
| 3* | 209.362 | 2.00 | 1.83481 | 42.7 |
| 4 | 101.378 | 9.95 | | |
| 5 | −82.998 | 1.80 | 1.83481 | 42.7 |
| 6 | −268.382 | 0.15 | | |
| 7 | 96.811 | 4.08 | 1.92286 | 18.9 |
| 8 | 323.506 | 1.59 | | |
| 9 | 154.148 | 8.11 | 1.60300 | 65.4 |
| 10* | −109.799 | 4.44 | | |
| 11 | −446.979 | 8.23 | 1.43387 | 95.1 |
| 12 | −52.841 | 0.13 | | |
| 13 | −52.249 | 1.70 | 1.80000 | 29.8 |
| 14 | −99.753 | 0.18 | | |
| 15 | 136.809 | 1.70 | 1.91650 | 31.6 |
| 16 | 51.311 | 13.70 | 1.43875 | 94.7 |
| 17 | −134.517 | 0.40 | | |
| 18 | 9,191.253 | 8.20 | 1.43387 | 95.1 |
| 19 | −70.101 | 0.40 | | |
| 20 | 101.328 | 7.96 | 1.76385 | 48.5 |
| 21 | −205.670 | (Variable) | | |
| 22 | 99.719 | 0.70 | 2.00100 | 29.1 |
| 23 | 17.675 | (Variable) | | |
| 24 | −50.857 | 0.70 | 1.43875 | 94.7 |
| 25 | 72.793 | 2.07 | | |
| 26 | −173.604 | 5.44 | 1.85478 | 24.8 |
| 27 | −14.028 | 0.70 | 1.88300 | 40.8 |
| 28 | 138.641 | 0.21 | | |
| 29 | 38.506 | 3.34 | 1.64769 | 33.8 |
| 30 | −217.686 | (Variable) | | |
| 31 | −33.587 | 0.80 | 1.72916 | 54.7 |
| 32 | 59.573 | 2.29 | 1.84666 | 23.8 |
| 33 | −23,892.610 | (Variable) | | |
| 34* | 67.598 | 6.49 | 1.58913 | 61.1 |
| 35 | −48.450 | (Variable) | | |
| 36 (Stop) | ∞ | 1.24 | | |
| 37 | 140.001 | 5.63 | 1.51742 | 52.4 |
| 38 | −41.749 | 1.00 | 1.83481 | 42.7 |
| 39 | −148.201 | 35.50 | | |
| 40 | 64.636 | 5.42 | 1.63980 | 34.5 |
| 41 | −50.346 | 1.66 | | |
| 42 | −97.093 | 0.90 | 1.88300 | 40.8 |
| 43 | 28.411 | 5.23 | 1.48749 | 70.2 |
| 44 | −134.553 | 0.20 | | |
| 45 | 64.009 | 7.67 | 1.43875 | 94.7 |
| 46 | −21.313 | 0.90 | 2.00100 | 29.1 |
| 47 | −55.457 | 0.13 | | |
| 48 | 145.976 | 5.25 | 1.48749 | 70.2 |
| 49 | −32.459 | 4.00 | | |
| 50 | ∞ | 33.00 | 1.60859 | 46.4 |
| 51 | ∞ | 13.20 | 1.51680 | 64.2 |
| 52 | ∞ | (Variable) | | |
| Image plane | ∞ | | | |

Aspherical Surface Data

First surface

K = 0.00000e+000  A4 = 4.46936e−006  A6 = 1.10306e−008  A8 = 7.77566e−012
A10 = 9.49062e−014  A12 = 1.11184e−016  A14 = 1.85247e−020  A16 = −6.48312e−026
A3 = 1.03502e−005  A5 = −1.89830e−007  A7 = −3.02435e−010  A9 = −1.17670e−012
A11 = −4.11432e−015  A13 = −1.90014e−018  A15 = −7.32030e−023

Third surface

K = 0.00000e+000  A4 = −2.17856e−006  A6 = −7.40025e−008  A8 = −7.11833e−010
A10 = −3.23357e−013  A12 = 1.59755e−015  A14 = −6.49135e−019  A16 = −2.05926e−022
A3 = −8.98227e−006  A5 = 4.24261e−007  A7 = 9.13249e−009  A9 = 3.03419e−011
A11 = −3.27278e−014  A13 = −1.78779e−017  A15 = 2.23441e−020

| Tenth surface | | | |
|---|---|---|---|
| K = 0.00000e+000 | A4 = 9.95672e−007 | A6 = 1.32461e−008 | A8 = 2.69099e−010 |
| A10 = 2.06572e−013 | A12 = −7.70103e−016 | A14 = 1.06094e−018 | A16 = 2.20738e−022 |
| A3 = −2.93337e−006 | A5 = −1.75957e−008 | A7 = −2.62528e−009 | A9 = −1.43267e−011 |
| A11 = 1.68324e−014 | A13 = −4.87745e−018 | A15 = −2.66360e−020 | |

| Thirty-fourth surface | | | |
|---|---|---|---|
| K = −1.40561e+001 | A4 = 1.35169e−006 | A6 = −4.55878e−009 | A8 = 2.86122e−012 |

Various Data

Zoom ratio 13.60

| | Wide angle | Intermediate | Telephoto |
|---|---|---|---|
| Focal length | 4.43 | 31.29 | 60.25 |
| F-number | 1.86 | 1.86 | 2.78 |
| Half angle of view | 51.15 | 9.97 | 5.22 |
| Image height | 5.50 | 5.50 | 5.50 |
| Total lens length | 314.60 | 314.60 | 314.60 |
| BF | 7.45 | 7.45 | 7.45 |
| d21 | 0.65 | 47.69 | 53.48 |
| d23 | 7.72 | 4.19 | 4.48 |
| d30 | 38.43 | 3.04 | 3.77 |
| d33 | 12.64 | 12.13 | 2.26 |
| d35 | 9.11 | 1.50 | 4.56 |
| d52 | 7.45 | 7.45 | 7.45 |

Zoom lens unit data

| Unit | First surface | Focal length |
|---|---|---|
| 1 | 1 | 30.26 |
| 2 | 22 | −21.38 |
| 3 | 24 | −148.06 |
| 4 | 31 | −50.80 |
| 5 | 34 | 48.73 |
| 6 | 36 | 52.97 |

Numerical Embodiment 3

Unit: mm
Surface data

| Surface number | r | d | nd | vd |
|---|---|---|---|---|
| 1* | −2,440.056 | 2.50 | 1.83481 | 42.7 |
| 2 | 31.805 | 17.32 | | |
| 3* | 149.046 | 2.00 | 1.83481 | 42.7 |
| 4 | 76.892 | 10.51 | | |
| 5 | −106.503 | 1.75 | 1.89190 | 37.1 |
| 6 | −701.504 | 0.15 | | |
| 7 | 96.907 | 4.26 | 1.95906 | 17.5 |
| 8 | 354.199 | 2.00 | | |
| 9 | 200.819 | 7.84 | 1.59522 | 67.7 |
| 10* | −102.442 | 4.41 | | |
| 11 | −441.091 | 8.07 | 1.43387 | 95.1 |
| 12 | −54.784 | 0.34 | | |
| 13 | −52.604 | 1.70 | 1.75520 | 27.5 |
| 14 | −112.274 | 0.18 | | |
| 15 | 172.755 | 1.70 | 1.91650 | 31.6 |
| 16 | 56.670 | 14.35 | 1.43875 | 94.7 |
| 17 | −108.571 | 0.40 | | |
| 18 | 1,049.793 | 9.46 | 1.43387 | 95.1 |
| 19 | −68.289 | 0.40 | | |
| 20 | 113.998 | 8.57 | 1.76385 | 48.5 |
| 21 | −173.194 | (Variable) | | |
| 22 | 86.514 | 0.70 | 2.00100 | 29.1 |
| 23 | 17.319 | 4.15 | | |
| 24 | −67.204 | 0.70 | 1.43875 | 94.7 |
| 25 | 58.617 | 2.31 | | |
| 26 | −183.166 | 5.73 | 1.85478 | 24.8 |
| 27 | −14.517 | 0.65 | 1.88300 | 40.8 |
| 28 | 122.213 | 0.21 | | |
| 29 | 37.048 | 2.97 | 1.64769 | 33.8 |
| 30 | −233.512 | (Variable) | | |
| 31 | −33.485 | 0.75 | 1.72916 | 54.7 |
| 32 | 52.080 | 2.45 | 1.84666 | 23.8 |
| 33 | −2,211.841 | (Variable) | | |
| 34* | 64.235 | 6.57 | 1.58913 | 61.1 |
| 35 | −54.423 | (Variable) | | |
| 36 (Stop) | ∞ | 2.07 | | |
| 37 | 146.474 | 5.48 | 1.51742 | 52.4 |
| 38 | −45.128 | 1.00 | 1.83481 | 42.7 |
| 39 | −186.320 | 35.49 | | |
| 40 | 54.214 | 5.80 | 1.63980 | 34.5 |
| 41 | −55.141 | 1.50 | | |
| 42 | −110.898 | 0.85 | 1.88300 | 40.8 |
| 43 | 26.795 | 5.81 | 1.48749 | 70.2 |
| 44 | −120.522 | 0.20 | | |
| 45 | 77.533 | 7.56 | 1.43875 | 94.7 |
| 46 | −20.849 | 0.85 | 2.00100 | 29.1 |
| 47 | −56.507 | 0.13 | | |
| 48 | 181.513 | 5.35 | 1.48749 | 70.2 |
| 49 | −30.620 | 4.00 | | |
| 50 | ∞ | 33.00 | 1.60859 | 46.4 |
| 51 | ∞ | 13.20 | 1.51680 | 64.2 |
| 52 | ∞ | (Variable) | | |
| Image plane | ∞ | | | |

Aspherical Surface Data

| First surface |
| --- |
| K = 0.00000e+000   A4 = 4.76599e-006   A6 = 2.34876e-008   A8 = 3.32114e-011<br>A10 = 1.08361e-013   A12 = 1.45131e-016   A14 = 5.37314e-022   A16 = -1.88075e-024<br>A3 = 8.53759e-006   A5 = -2.91957e-007   A7 = -1.09456e-009   A9 = -1.52308e-012<br>A11 = -5.29333e-015   A13 = -1.88364e-018   A15 = 2.49247e-022 |

| Third surface |
| --- |
| K = 0.00000e+000   A4 = -2.13576e-006   A6 = -5.67472e-008   A8 = -5.37801e-010<br>A10 = -1.96389e-013   A12 = 1.85283e-015   A14 = -3.01329e-019   A16 = -2.20403e-022<br>A3 = -3.60251e-006   A5 = 3.56225e-007   A7 = 6.89385e-009   A9 = 2.29023e-011<br>A11 = -3.37819e-014   A13 = -3.37814e-017   A15 = 2.03629e-020 |

| Tenth surface |
| --- |
| K = 0.00000e+000   A4 = 7.74130e-007   A6 = 3.72970e-009   A8 = 2.38598e-010<br>A10 = 4.29430e-013   A12 = -7.21051e-016   A14 = 8.28730e-019   A16 = 2.10538e-022<br>A3 = 4.29253e-009   A5 = 4.39822e-008   A7 = -1.74984e-009   A9 = -1.60309e-011<br>A11 = 8.20870e-015   A13 = 1.99888e-018   A15 = -2.37790e-020 |

| Thirty-fourth surface |
| --- |
| K = -1.02237e+001   A4 = 8.99481e-007   A6 = -2.52712e-009   A8 = 6.95575e-013 |

Various Data

Zoom ratio 15.40

| | Wide angle | Intermediate | Telephoto |
| --- | --- | --- | --- |
| Focal length | 4.15 | 30.13 | 63.92 |
| F-number | 1.86 | 1.86 | 2.97 |
| Half angle of view | 52.96 | 10.35 | 4.92 |
| Image height | 5.50 | 5.50 | 5.50 |
| Total lens length | 323.65 | 323.65 | 323.65 |
| BF | 7.45 | 7.45 | 7.45 |
| d21 | 0.64 | 49.23 | 55.37 |
| d30 | 42.49 | 3.06 | 3.28 |
| d33 | 15.87 | 14.92 | 2.10 |
| d35 | 9.80 | 1.60 | 8.05 |
| d52 | 7.45 | 7.45 | 7.45 |

Zoom Lens Unit Data

| Unit | First surface | Focal length |
| --- | --- | --- |
| 1 | 1 | 29.21 |
| 2 | 22 | -19.70 |
| 3 | 31 | -52.38 |
| 4 | 34 | 50.86 |
| 5 | 36 | 54.08 |

Numerical Embodiment 4

Unit: mm
Surface data

| Surface number | r | d | nd | vd |
| --- | --- | --- | --- | --- |
| 1* | 475.907 | 2.50 | 1.83481 | 42.7 |
| 2 | 33.006 | 17.18 | | |
| 3* | 130.411 | 2.00 | 1.83481 | 42.7 |
| 4 | 73.689 | 11.20 | | |
| 5 | -113.700 | 1.75 | 1.89190 | 37.1 |
| 6 | -1,198.361 | 0.15 | | |
| 7 | 90.419 | 4.74 | 1.95906 | 17.5 |
| 8 | 305.511 | 5.08 | | |
| 9 | 205.636 | 8.23 | 1.59522 | 67.7 |
| 10* | -105.286 | 5.14 | | |
| 11 | -319.741 | 6.35 | 1.43387 | 95.1 |
| 12 | -67.140 | 1.42 | | |
| 13 | -53.955 | 1.70 | 1.75520 | 27.5 |
| 14 | -100.394 | 0.18 | | |
| 15 | 184.133 | 1.70 | 1.91650 | 31.6 |
| 16 | 58.915 | 14.13 | 1.43875 | 94.7 |
| 17 | -87.470 | 0.40 | | |
| 18 | -238.998 | 6.38 | 1.43387 | 95.1 |
| 19 | -70.373 | 0.40 | | |
| 20 | 123.551 | 5.61 | 1.76385 | 48.5 |
| 21 | -1,248.700 | (Variable) | | |
| 22 | 588.638 | 5.04 | 1.59522 | 67.7 |
| 23 | -126.876 | (Variable) | | |
| 24 | 78.715 | 0.70 | 2.00100 | 29.1 |
| 25 | 16.851 | 5.14 | | |
| 26 | -36.557 | 0.70 | 1.43875 | 94.7 |

-continued

Unit: mm
Surface data

| Surface number | r | d | nd | νd |
|---|---|---|---|---|
| 27 | 155.542 | 1.60 | | |
| 28 | 3,827.478 | 5.53 | 1.85478 | 24.8 |
| 29 | −17.600 | 0.65 | 1.88300 | 40.8 |
| 30 | 132.977 | 0.21 | | |
| 31 | 37.312 | 2.95 | 1.64769 | 33.8 |
| 32 | −303.836 | (Variable) | | |
| 33 | −31.012 | 0.75 | 1.72916 | 54.7 |
| 34 | 54.664 | 2.43 | 1.84666 | 23.8 |
| 35 | −548.605 | (Variable) | | |
| 36* | 93.074 | 6.66 | 1.58913 | 61.1 |
| 37 | −45.565 | (Variable) | | |
| 38 (Stop) | ∞ | 1.00 | | |
| 39 | 84.893 | 5.58 | 1.51742 | 52.4 |
| 40 | −52.761 | 1.00 | 1.83481 | 42.7 |
| 41 | 2,129.278 | 35.50 | | |
| 42 | 51.860 | 5.59 | 1.63980 | 34.5 |

-continued

Unit: mm
Surface data

| Surface number | r | d | nd | νd |
|---|---|---|---|---|
| 43 | −57.848 | 1.22 | | |
| 44 | −185.920 | 0.85 | 1.88300 | 40.8 |
| 45 | 25.593 | 5.12 | 1.48749 | 70.2 |
| 46 | −690.372 | 0.20 | | |
| 47 | 76.520 | 7.38 | 1.43875 | 94.7 |
| 48 | −21.384 | 0.85 | 2.00100 | 29.1 |
| 49 | −54.724 | 0.13 | | |
| 50 | 154.436 | 5.15 | 1.48749 | 70.2 |
| 51 | −32.883 | 4.00 | | |
| 52 | ∞ | 33.00 | 1.60859 | 46.4 |
| 53 | ∞ | 13.20 | 1.51680 | 64.2 |
| 54 | ∞ | (Variable) | | |

Image Plane ∞

Aspherical Surface Data

First surface

K = 0.00000e+000　A4 = 1.66699e−006　A6 = 3.97834e−008　A8 = 6.33138e−011
A10 = 6.47897e−014　A12 = 1.06423e−016　A14 = 2.14372e−021　A16 = −1.48668e−024
A3 = 1.89824e−005　A5 = −3.19812e−007　A7 = −2.13277e−009　A9 = −1.45990e−012
A11 = −3.44034e−015　A13 = −1.53431e−018　A15 = 1.86785e−022

Third surface

K = 0.00000e+000　A4 = −3.58730e−007　A6 = −3.95559e−008　A8 = −5.25902e−010
A10 = −1.98706e−012　A12 = −7.36620e−016　A14 = 1.36899e−018　A16 = 1.28157e−022
A3 = −1.81162e−005　A5 = 2.24449e−007　A7 = 5.18668e−009　A9 = 3.85000e−011
A11 = 6.40546e−014　A13 = −2.92776e−017　A15 = −2.20320e−020

Tenth surface

K = 0.00000e+000　A4 = 1.28011e−006　A6 = 1.58176e−008　A8 = 2.03861e−010
A10 = 1.60646e−013　A12 = 7.94518e−018　A14 = 1.18241e−018　A16 = 1.74175e−022
A3 = −4.66744e−006　A5 = −6.75467e−008　A7 = −2.31123e−009　A9 = −9.89999e−012
A11 = 4.98860e−015　A13 = −2.46231e−017　A15 = −2.32811e−020

Thirty-sixth surface

K = −2.89398e+000　A4 = −2.66160e−006　A6 = 6.70520e−010　A8 = −1.02571e−012

Various Data

Zoom ratio 15.05

|  | Wide angle | Intermediate | Telephoto |
|---|---|---|---|
| Focal length | 4.65 | 41.11 | 70.00 |
| F-number | 1.86 | 1.91 | 3.25 |
| Half angle of view | 49.79 | 7.62 | 4.49 |
| Image height | 5.50 | 5.50 | 5.50 |
| Total lens length | 328.65 | 328.65 | 328.65 |
| BF | 7.45 | 7.45 | 7.45 |
| d21 | 1.00 | 6.99 | 7.44 |
| d23 | 1.64 | 46.01 | 49.32 |
| d32 | 40.15 | 3.05 | 3.18 |
| d35 | 21.23 | 13.79 | 2.11 |
| d37 | 8.82 | 2.99 | 10.78 |
| d54 | 7.45 | 7.45 | 7.45 |

Zoom Lens Unit Data

| Unit | First surface | Focal length |
|---|---|---|
| 1 | 1 | 50.81 |
| 2 | 22 | 175.21 |
| 3 | 24 | −21.68 |
| 4 | 33 | −50.69 |
| 5 | 36 | 52.66 |
| 6 | 38 | 55.59 |

Numerical Embodiment 5

Unit: mm
Surface data

| Surface number | r | d | nd | vd |
|---|---|---|---|---|
| 1* | 5,608.139 | 2.50 | 1.83481 | 42.7 |
| 2 | 31.331 | 17.03 |  |  |
| 3* | 154.941 | 2.00 | 1.83481 | 42.7 |
| 4 | 89.851 | 9.92 |  |  |
| 5 | −98.714 | 1.80 | 1.83481 | 42.7 |
| 6 | −668.999 | 0.15 |  |  |
| 7 | 94.656 | 4.22 | 1.92286 | 18.9 |
| 8 | 320.080 | 1.66 |  |  |
| 09 | 159.610 | 8.55 | 1.60300 | 65.4 |
| 10* | −95.256 | 4.40 |  |  |
| 11 | −515.967 | 7.88 | 1.43387 | 95.1 |
| 12 | −54.044 | 0.17 |  |  |
| 13 | −53.124 | 1.70 | 1.80000 | 29.8 |
| 14 | −112.346 | 0.18 |  |  |
| 15 | 161.906 | 1.70 | 1.91650 | 31.6 |
| 16 | 53.144 | 13.31 | 1.43875 | 94.7 |
| 17 | −119.869 | 0.40 |  |  |
| 18 | 601.933 | 8.74 | 1.43387 | 95.1 |
| 19 | −69.960 | 0.40 |  |  |
| 20 | 104.022 | 8.25 | 1.76385 | 48.5 |
| 21 | −165.165 | (Variable) |  |  |
| 22 | 93.594 | 0.70 | 2.00100 | 29.1 |
| 23 | 17.271 | 3.65 |  |  |
| 24 | −153.055 | 0.70 | 1.43875 | 94.7 |
| 25 | 44.340 | 2.63 |  |  |
| 26 | −121.391 | 5.64 | 1.85478 | 24.8 |
| 27 | −13.691 | 0.70 | 1.88300 | 40.8 |
| 28 | 107.566 | 0.21 |  |  |
| 29 | 36.210 | 2.96 | 1.64769 | 33.8 |
| 30 | −177.327 | (Variable) |  |  |
| 31 | −37.668 | 0.80 | 1.72916 | 54.7 |
| 32 | 56.081 | (Variable) |  |  |
| 33 | 65.312 | 2.48 | 1.84666 | 23.8 |
| 34 | −459.929 | (Variable) |  |  |
| 35* | 67.709 | 5.84 | 1.58913 | 61.1 |
| 36 | −80.010 | (Variable) |  |  |
| 37 (Stop) | ∞ | 1.00 |  |  |
| 38 | 112.906 | 5.45 | 1.51742 | 52.4 |
| 39 | −49.076 | 1.00 | 1.83481 | 42.7 |
| 40 | −217.557 | 35.50 |  |  |
| 41 | 54.825 | 5.53 | 1.63980 | 34.5 |
| 42 | −55.707 | 1.65 |  |  |
| 43 | −98.880 | 0.90 | 1.88300 | 40.8 |
| 44 | 27.935 | 5.54 | 1.48749 | 70.2 |
| 45 | −102.404 | 0.20 |  |  |
| 46 | 69.714 | 7.57 | 1.43875 | 94.7 |
| 47 | −21.216 | 0.90 | 2.00100 | 29.1 |
| 48 | −62.919 | 0.13 |  |  |
| 49 | 142.218 | 5.45 | 1.48749 | 70.2 |
| 50 | −31.118 | 4.00 |  |  |
| 51 | ∞ | 33.00 | 1.60859 | 46.4 |
| 52 | ∞ | 13.20 | 1.51680 | 64.2 |
| 53 | ∞ | (Variable) |  |  |
| Image plane | ∞ |  |  |  |

Aspherical Surface Data

First surface

| | | | |
|---|---|---|---|
| K = 0.00000e+000 | A4 = 3.62280e−006 | A6 = 1.07634e−008 | A8 = 7.77615e−012 |
| A10 = 9.49473e−014 | A12 = 1.11167e−016 | A14 = 1.85189e−020 | A16 = −6.09937e−026 |
| A3 = 1.96700e−005 | A5 = −1.65225e−007 | A7 = −3.05632e−010 | A9 = −1.17448e−012 |
| A11 = −4.11462e−015 | A13 = −1.90023e−018 | A15 = −7.32295e−023 | |

Third surface

| | | | |
|---|---|---|---|
| K = 0.00000e+000 | A4 = −2.05168e−006 | A6 = −7.43153e−008 | A8 = −7.11008e−010 |
| A10 = −3.24318e−013 | A12 = 1.59804e−015 | A14 = −6.50890e−019 | A16 = −2.04876e−022 |
| A3 = −1.39573e−005 | A5 = 4.24389e−007 | A7 = 9.14976e−009 | A9 = 3.03043e−011 |
| A11 = −3.27332e−014 | A13 = −1.77971e−017 | A15 = 2.23061e−020 | |

| Tenth surface | | | |
|---|---|---|---|
| K = 0.00000e+000 | A4 = 1.23091e−006 | A6 = 1.39417e−008 | A8 = 2.71078e−010 |
| A10 = 2.07837e−013 | A12 = −7.68131e−016 | A14 = 1.05198e−018 | A16 = 2.18702e−022 |
| A3 = −3.67680e−006 | A5 = −2.23995e−008 | A7 = −2.66232e−009 | A9 = −1.44132e−011 |
| A11 = 1.68301e−014 | A13 = −4.84886e−018 | A15 = −2.63710e−020 | |

| Thirty-fifth surface | | | |
|---|---|---|---|
| K = −1.41109e+001 | A4 = 2.91663e−006 | A6 = −5.45057e−009 | A8 = 3.22937e−012 |

Various Data

| Zoom ratio 13.60 | | | |
|---|---|---|---|
| | Wide angle | Intermediate | Telephoto |
| Focal length | 4.43 | 28.25 | 60.25 |
| F-number | 1.86 | 1.86 | 2.78 |
| Half angle of view | 51.15 | 11.02 | 5.22 |
| Image height | 5.50 | 5.50 | 5.50 |
| Total lens length | 315.65 | 315.65 | 315.65 |
| BF | 7.45 | 7.45 | 7.45 |
| d21 | 0.64 | 42.70 | 48.74 |
| d30 | 36.66 | 2.73 | 3.91 |
| d32 | 2.99 | 2.89 | 2.15 |
| d34 | 17.36 | 16.13 | 2.11 |
| d36 | 8.30 | 1.50 | 9.04 |
| d53 | 7.45 | 7.45 | 7.45 |

Zoom Lens Unit Data

| Unit | First surface | Focal length |
|---|---|---|
| 1 | 1 | 28.52 |
| 2 | 22 | −18.92 |
| 3 | 31 | −30.66 |
| 4 | 33 | 67.03 |
| 5 | 35 | 62.93 |
| 6 | 37 | 54.18 |

TABLE 1

Corresponding values of each conditional expression in Numerical Embodiments 1 to 5

| | Embodiment 1 | Embodiment 2 | Embodiment 3 | Embodiment 4 | Embodiment 5 |
|---|---|---|---|---|---|
| L1/LSP | 0.51 | 0.51 | 0.50 | 0.51 | 0.50 |
| M4m/M2 | 0.13 | 0.14 | 0.15 | 0.11 | 0.14 |
| M4mt/M2 | −0.06 | −0.06 | −0.12 | −0.14 | −0.16 |
| fw/X | 0.40 | 0.40 | 0.38 | 0.42 | 0.40 |
| −f1n/f1 | 0.72 | 0.72 | 0.72 | 0.77 | 0.73 |
| L1 | 95.7 | 94.9 | 97.9 | 102.3 | 86.7 |
| LSP | 186.7 | 186.2 | 193.9 | 201.4 | 173.1 |
| M4m | 6.6 | 7.6 | 8.2 | 5.8 | 6.8 |
| M2 | 52.1 | 52.8 | 54.7 | 54.1 | 48.1 |
| M4mt | −3.3 | −3.1 | −6.5 | −7.8 | −7.5 |
| fw | 4.4 | 4.4 | 4.2 | 4.7 | 4.4 |
| X | 11.0 | 11.0 | 11.0 | 11.0 | 11.0 |
| f1n | −21.5 | −21.8 | −20.9 | −23.1 | −20.9 |
| f1 | 29.7 | 30.3 | 29.2 | 30.1 | 28.5 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-030906, filed Feb. 22, 2019, which is hereby incorporated by reference herein in its entirety.

What is claimed is:

1. A zoom lens comprising in order from an object side to an image side:

one or two first lens units having a positive refractive power, the one or two first lens units including a lens unit, the lens unit configured not to move for zooming and arranged closest to the object side;

one or two second lens units having a negative refractive power and configured to move for zooming;

one or two third lens units configured to move for zooming, the one or two third lens units including a lens unit, the lens unit having a negative refractive power and arranged closest to the object side;

a fourth lens unit having a positive refractive power and configured to move for zooming; and a fifth lens unit configured not to move for zooming, wherein an interval of each pair of adjacent lens units is changed for zooming, wherein the zoom lens further comprises an aperture stop arranged in the image side with respect to the fourth lens unit, wherein the one or two second lens units are configured to move toward the image side for zooming from a wide angle end to a telephoto end, and the one or two third lens units are configured to move along a locus convex toward the object side for zooming, and wherein conditional expressions $$0.25 < L1/LSP < 0.7; \text{ and}$$

$$0.05 < M4m/M2 < 0.5,$$

are satisfied where LSP represents a distance between a surface of the one or two first lens units closest to the object side and the aperture stop, L1 represents a length of the one or two first lens units in an optical axis direction, M2 represents an amount of movement from the wide angle end to the telephoto end of a lens unit closest to the object side in the one or two second lens units, and M4m represents an amount of movement of the fourth lens unit from the wide angle end to an intermediate zoom state in which the one or two second lens units and the one or two third lens units are closest to each other.

2. The zoom lens according to claim 1, wherein a conditional expression $$-0.3<M4mt/M2<0,$$

is satisfied where M4mt represents an amount of movement of the fourth lens unit from the intermediate zoom state to the telephoto end.

3. The zoom lens according to claim 1, wherein a conditional expression $$fw/X<0.65,$$

is satisfied where fw represents a focal length of the zoom lens at the wide angle end, and X represents a diagonal length of an image size.

4. The zoom lens according to claim 1,
wherein the one or two first lens units consist of, in order from the object side to the image side, a negative lens subunit having a negative refractive power and a positive lens subunit having a positive refractive power, and wherein a conditional expression $$-f1n/f1<0.9,$$

is satisfied where f1n represents a focal length of the negative lens subunit, and f1 represents a focal length of the one or two first lens units.

5. The zoom lens according to claim 4, wherein a number of lenses included in the negative lens subunit is not greater than one-third of a number of lenses included in the one or two first lens units.

6. The zoom lens according to claim 1,
wherein the one or two first lens units consist of two lens units,
wherein the one or two second lens units consist of one lens unit,
wherein the one or two third lens units consist of one lens unit, and
wherein an amount of change in an interval between the two lens units of the one or two first lens units for zooming is not greater than 0.2 times a length of the zoom lens in an optical axis direction.

7. The zoom lens according to claim 1,
wherein the one or two first lens units consist of one lens unit having a positive refractive power,
wherein the one or two second lens units consist of two lens units,
wherein the one or two third lens units consist of one lens unit, and
wherein an amount of change in an interval between the two lens units of the one or two second lens units for zooming is not greater than 0.2 times a length of the zoom lens in an optical axis direction.

8. The zoom lens according to claim 1,
wherein the one or two first lens units consist of one lens unit,
wherein the one or two second lens units consist of one lens unit,
wherein the one or two third lens units consist of two lens units, and
wherein the two lens units of the one or two third lens units consist of, in order from the object side to the image side, a lens unit having a negative refractive power and a lens unit having a positive refractive power.

9. The zoom lens according to claim 1, wherein the fourth lens unit includes an aspherical surface.

10. An image pickup apparatus comprising:
a zoom lens; and
an image pickup element configured to receive an image formed by the zoom lens,
wherein the zoom lens comprises in order from an object side to an image side:
one or two first lens units having a positive refractive power, the one or two first lens units including a lens unit, the lens unit configured not to move for zooming and arranged closest to the object side;
one or two second lens units having a negative refractive power and configured to move for zooming;
one or two third lens units configured to move for zooming, the one or two third lens units including a lens unit, the lens unit having a negative refractive power and arranged closest to the object side;
a fourth lens unit having a positive refractive power and configured to move for zooming; and
a fifth lens unit configured not to move for zooming,
wherein an interval of each pair of adjacent lens units is changed for zooming,
wherein the zoom lens further comprises an aperture stop arranged in the image side with respect to the fourth lens unit,
wherein the one or two second lens units are configured to move toward the image side for zooming from a wide angle end to a telephoto end, and the one or two third lens units are configured to move along a locus convex toward the object side for zooming, and
wherein conditional expressions $$0.25<L1/LSP<0.7; \text{ and}$$

$$0.05<M4m/M2<0.5,$$

are satisfied where LSP represents a distance between a surface of the one or two first lens units closest to the object side and the aperture stop, L1 represents a length of the one or two first lens units in an optical axis direction, M2 represents an amount of movement from the wide angle end to the telephoto end of a lens unit closest to the object side in the one or two second lens units, and M4m represents an amount of movement of the fourth lens unit from the wide angle end to an intermediate zoom state in which the one or two second lens units and the one or two third lens units are closest to each other.

11. A zoom lens comprising in order from an object side to an image side:
a first lens unit having a positive refractive power and configured not to move for zooming;
a second lens unit having a negative refractive power and configured to move for zooming;
a third lens unit having a negative refractive power and configured to move for zooming;
a fourth lens unit having a positive refractive power and configured to move for zooming; and
a fifth lens unit configured not to move for zooming,
wherein an interval between each pair of adjacent lens units is changed for zooming,
wherein the zoom lens further comprises an aperture stop arranged on the image side with respect to the fourth lens unit,
wherein the second lens unit is configured to move toward the image side for zooming from a wide angle end to a telephoto end, and the third lens unit is configured to move along a locus convex toward the object side for zooming, and wherein conditional expressions $0.25 < L1/LSP < 0.7$, and $0.05 < M4m/M2 < 0.5$, are satisfied where LSP represents a distance between a surface of the first lens unit closest to the object side and the aperture stop, L1 represents a length of the first lens unit in an optical axis direction, M2 represents an amount of movement from the wide angle end to the telephoto end of the second lens unit, and M4m represents an amount of movement of the fourth lens unit from the wide angle end to an intermediate zoom state in which the second lens unit and the third lens unit are closest to each other.

12. The zoom lens according to claim 11, wherein a conditional expression $-0.3 < M4mt/M2 < 0$, is satisfied where M4mt represents an amount of movement of the fourth lens unit from the intermediate zoom state to the telephoto end.

13. The zoom lens according to claim 11, wherein the first lens unit consists of, in order from the object side to the image side, a negative lens subunit having a negative refractive power and a positive lens subunit having a positive refractive power, and wherein a conditional expression $-f1n/f1 < 0.9$, is satisfied where f1n represents a focal length of the negative lens subunit, and f1 represents a focal length of the first lens unit, wherein a number of lenses included in the negative lens subunit is not greater than one-third of a number of lenses included in the first lens unit.

14. The zoom lens according to claim 11, wherein the fourth lens unit includes an aspherical surface.

15. An image pickup apparatus comprising:
a zoom lens according to claim 11; and
an image pickup element configured to receive an image formed by the zoom lens.

* * * * *